(12) United States Patent
Park et al.

(10) Patent No.: US 11,087,664 B2
(45) Date of Patent: *Aug. 10, 2021

(54) DC-DC CONVERTER AND DISPLAY DEVICE INCLUDING THE SAME

(71) Applicant: SAMSUNG DISPLAY CO., LTD., Yongin-si (KR)

(72) Inventors: Sung Chun Park, Yongin-si (KR); Yoon Young Lee, Yongin-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/895,510

(22) Filed: Jun. 8, 2020

(65) Prior Publication Data

US 2020/0302849 A1 Sep. 24, 2020

Related U.S. Application Data

(63) Continuation of application No. 16/132,905, filed on Sep. 17, 2018, now Pat. No. 10,679,540.

(30) Foreign Application Priority Data

Dec. 4, 2017 (KR) .................. 10-2017-0165314

(51) Int. Cl.
*G09G 3/20* (2006.01)
*H02M 3/158* (2006.01)
(Continued)

(52) U.S. Cl.
CPC ............. *G09G 3/20* (2013.01); *H02M 1/32* (2013.01); *H02M 3/158* (2013.01);
(Continued)

(58) Field of Classification Search
CPC ......... G09G 2330/02; G09G 2330/021; G09G 2330/028; H02M 1/36; H02M 2001/0025; H02M 3/156
See application file for complete search history.

(56) References Cited

U.S. PATENT DOCUMENTS 3,035,633 A1 10/2011 Park
9,240,138 B2 1/2016 Seo
(Continued)

FOREIGN PATENT DOCUMENTS

| KR | 100805547 B1 | 2/2008 |
| KR | 101100947 B1 | 12/2011 |
| KR | 101469479 B1 | 12/2014 |

*Primary Examiner* — Sanjiv D. Patel
(74) *Attorney, Agent, or Firm* — Cantor Colburn LLP

(57) ABSTRACT

A direct current-to-direct current ("DC-DC") converter includes: a first converter which outputs a first power voltage in a normal mode or a power saving mode based on a inductor current generated therein, where the first converter operates in a first driving manner in the normal mode, and operates in a second driving manner in the power saving mode; a second converter which outputs a second power voltage based on a inductor current generated therein, where the second converter operates in a third driving manner in the power saving mode, and a magnitude of the second power voltage in the power saving mode is different from that in the normal mode; and a mode selector which supplies a mode control signal to the first and second converters, where the first and second converters are driven in the normal mode or the power saving mode based on the mode control signal.

16 Claims, 17 Drawing Sheets

(51) Int. Cl.
*H02M 1/32* (2007.01)
*H02M 1/00* (2006.01)

(52) U.S. Cl.
CPC . *G09G 2330/021* (2013.01); *G09G 2330/028* (2013.01); *H02M 2001/0032* (2013.01)

(56) References Cited

U.S. PATENT DOCUMENTS

| | | |
|---|---|---|
| 9,437,134 B2 | 9/2016 | Choi et al. |
| 2010/0289467 A1 | 11/2010 | Wu et al. |
| 2012/0050249 A1* | 3/2012 | Jin ........................... G09G 3/20 345/212 |
| 2013/0002639 A1* | 1/2013 | Park ...................... H02M 3/156 345/212 |
| 2013/0093407 A1* | 4/2013 | Heo ...................... H02M 3/156 323/290 |
| 2013/0169180 A1 | 7/2013 | Park et al. |
| 2014/0301114 A1 | 10/2014 | Matsumoto |
| 2015/0194124 A1* | 7/2015 | Yamauchi ................ G09G 5/00 345/211 |
| 2015/0256079 A1* | 9/2015 | Kimura ............. H02M 3/33507 363/15 |
| 2016/0005376 A1 | 1/2016 | Joo et al. |
| 2016/0049872 A1 | 2/2016 | Park |
| 2016/0117979 A1* | 4/2016 | An ....................... G09G 3/3208 345/211 |
| 2016/0117992 A1* | 4/2016 | Park ..................... G09G 3/3275 345/690 |
| 2016/0125791 A1 | 5/2016 | Park |
| 2017/0061877 A1* | 3/2017 | Lee .................... H01L 27/3262 |

\* cited by examiner

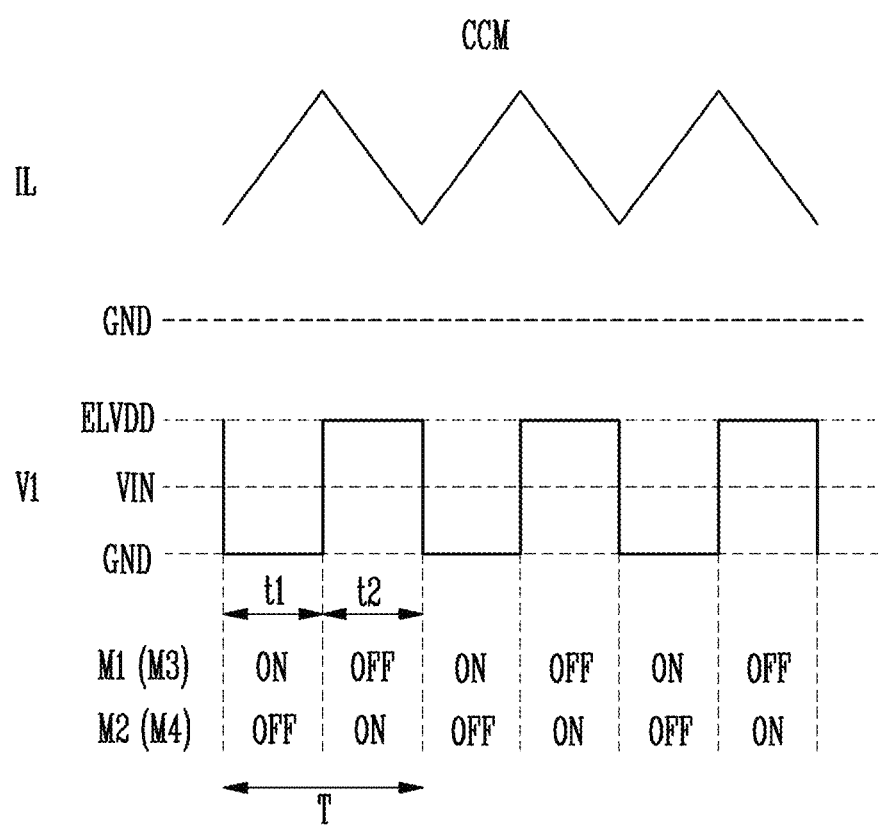

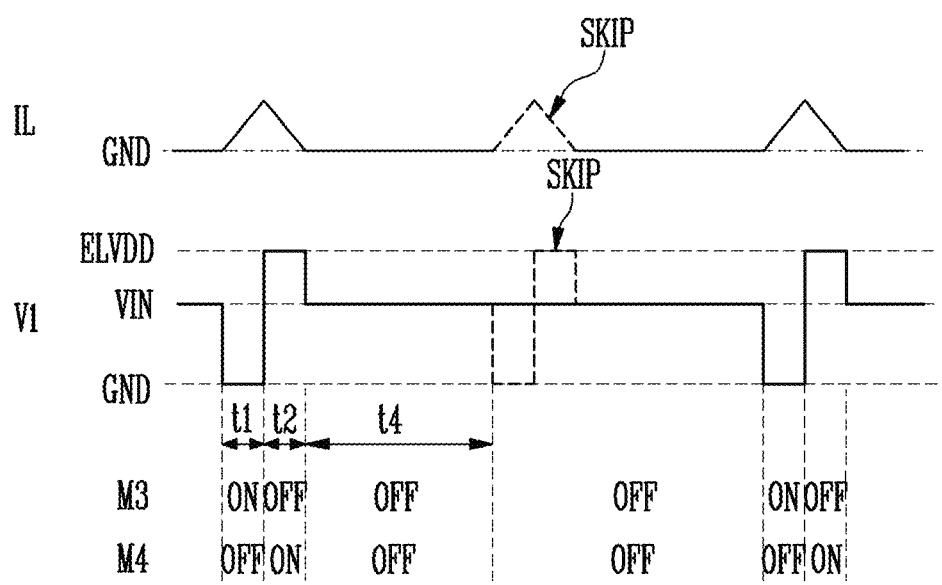

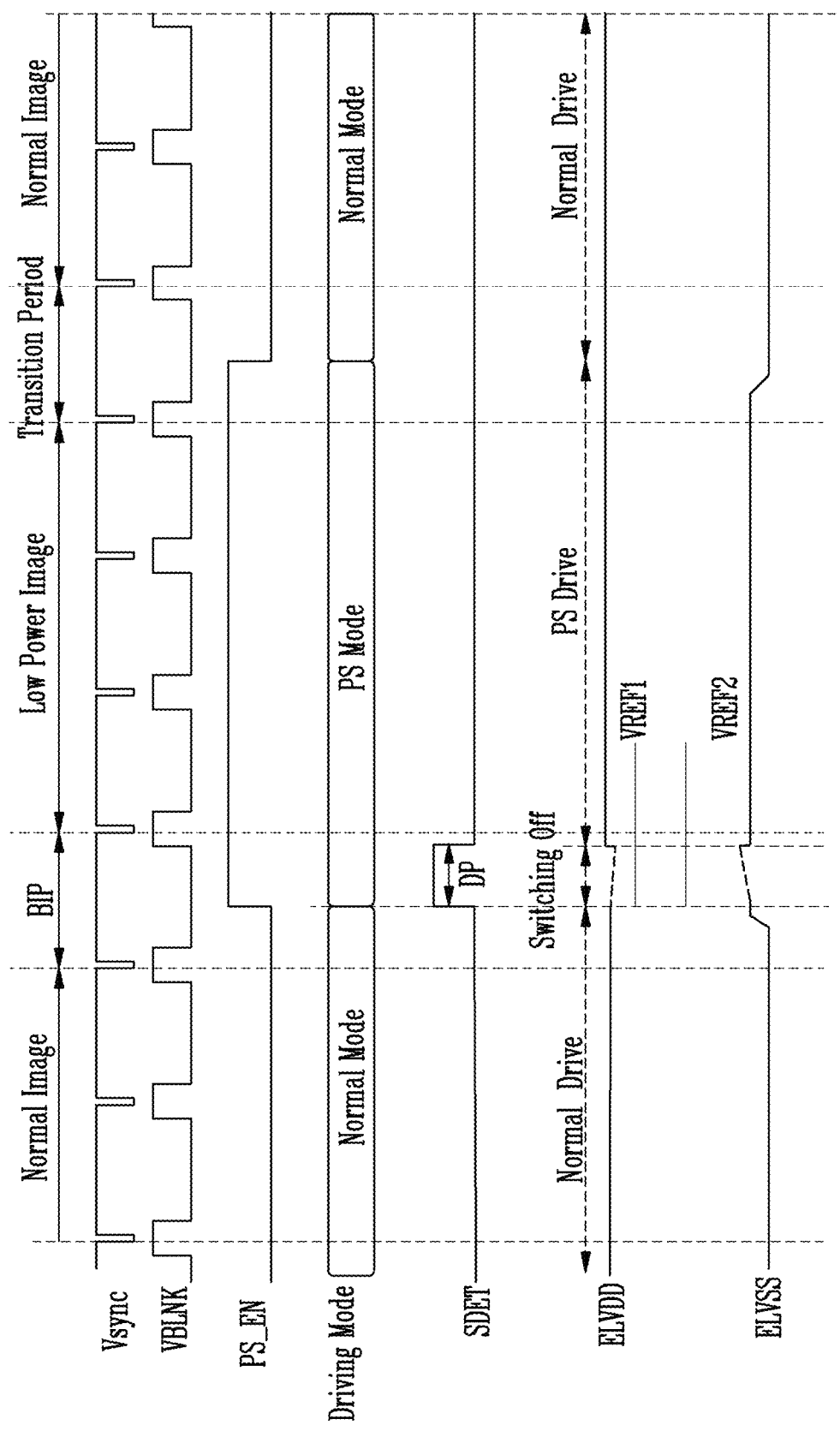

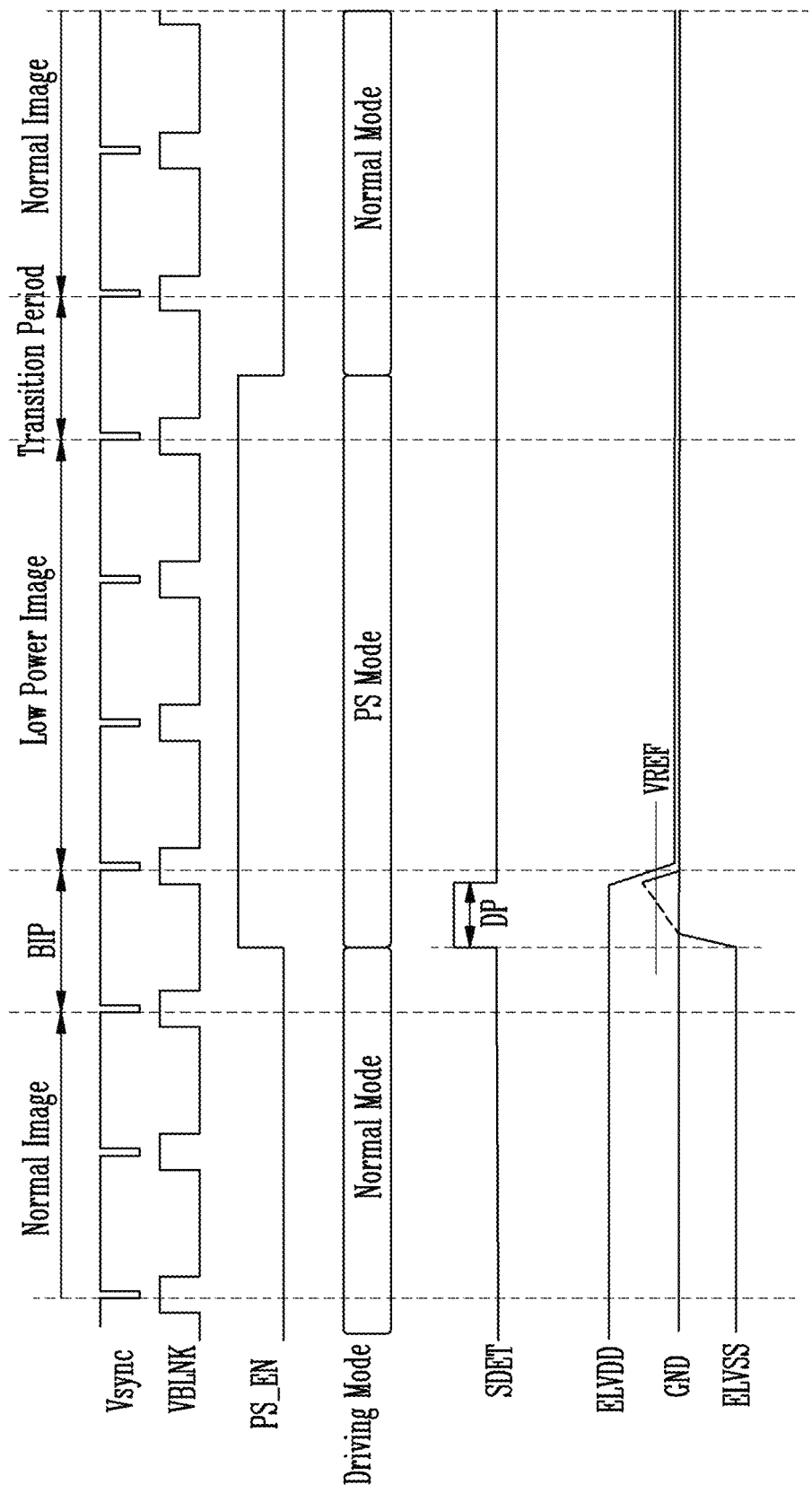

DC-DC CONVERTER AND DISPLAY DEVICE INCLUDING THE SAME

This application is a continuation of U.S. patent application Ser. No. 16/132,905, filed on Sep. 17, 2018, which claims priority to Korean Patent Application No. 10-2017-0165314, filed on Dec. 4, 2017, and all the benefits accruing therefrom under 35 U.S.C. § 119, the content of which in its entirety is herein incorporated by reference.

BACKGROUND

1. Field

Embodiments of the disclosure relate to a display device, and more particularly, to a direct current-to-direct current ("DC-DC") converter included in a display device.

2. Related Art

A display device typically includes a DC-DC converter for generating a high-potential voltage and a low-potential voltage, which are used to drive pixels, by converting an input voltage supplied from the outside. In such a display device, the DC-DC converter may generate and supply positive and negative voltages to the pixels through a voltage line.

SUMMARY

As size or range of displayable luminance of a display panel included in a display device increases, the range of driving current provided to the display panel increases. Accordingly, when the display device is driven at a low luminance, etc., where the magnitude of driving current is small, the conversion efficiency of a direct current-to-direct current ("DC-DC") converter in the display device is decreased. In addition, as power loss is increased due to a relatively large internal resistor included in the DC-DC converter or repeated switching of the DC-DC converter, unnecessary power consumption and heat generation increase.

Embodiments provide a DC-DC converter that is driven in a normal mode and a power saving mode with reduced power loss.

Embodiments also provide a display device including the DC-DC converter.

According to an embodiment of the disclosure, a DC-DC converter includes: a first converter which outputs a first power voltage in a normal mode or in a power saving mode based on a first inductor current generated by alternately turning on a plurality of transistors therein, where the first converter operates in a first driving manner in the normal mode, and operates in a second driving manner in the power saving mode; a second converter which outputs a second power voltage based on a second inductor current generated by alternately turning on a plurality of transistors therein, where the second converter operates in a third driving manner in the power saving mode, and a magnitude of the second power voltage in the power saving mode is different from a magnitude of the second power voltage in the normal mode; and a mode selector which supplies a mode control signal to the first and second converters, where the first and second converters are driven in the normal mode or the power saving mode based on the mode control signal.

In an embodiment, turn-on times of the transistors in the second driving manner may be less than turn-on times of the transistors in the first driving manner during a same period, and turn-on times of the transistors in the third driving manner may be smaller than turn-on times of the transistors in the second driving manner during the same period.

In an embodiment, the second converter may operate in one of the first driving manner, the second driving manner and the third driving manner, which is determined based on the magnitude of a load of a display panel connected thereto, in the normal mode.

In an embodiment, the third driving manner may be implemented as a pulse frequency modulation ("PFM") manner.

In an embodiment, when the first converter operates in the first driving manner, a magnitude of the first inductor current may be continuously changed, and when the first converter operates in the second driving manner, the magnitude of the first inductor current may not be changed during a predetermined period.

In an embodiment, when the second converter operates in the second driving manner, a magnitude of the second inductor current may not be changed during a first discontinuous period, and when the second converter operates in the third driving manner, m the magnitude of the second inductor current may not be changed during a second discontinuous period. In such an embodiment, the second discontinuous period may be longer than the first discontinuous period.

In an embodiment, the first inductor current generated in the first driving manner may have a first peak value, and the first inductor current generated in the second driving manner may have a second peak value less than the first peak value.

In an embodiment, a driving frequency in the power saving mode may be lower than a driving frequency in the normal mode.

In an embodiment, the driving frequency in the power saving mode may be decreased to a preset value as a magnitude of a load of a display panel connected thereto is decreased.

In an embodiment, the first converter may include: a first inductor coupled between an input power source and a first node, where the first inductor may generate the first inductor current; a first transistor coupled between the first node and a ground; a first power saving transistor coupled in parallel to the first transistor, where the first power saving transistor may have a size smaller than a size of the first transistor; a second transistor coupled between the first node and a first output end; a second power saving transistor coupled in parallel to the second transistor, where the second power saving transistor may have a size smaller than a size of the second transistor; and a first switching controller which controls on/off operations of the first transistor, the second transistor, the first power saving transistor and the second power saving transistor. In such an embodiment, the first transistor and the second transistor may be alternately turned on in the normal mode, and the first power saving transistor and the second power saving transistor may be alternately turned on in the power saving mode.

In an embodiment, the first converter may further include: a first switch coupled between a gate electrode of the first transistor and a gate electrode of the first power saving transistor, where the first switch may be turned on in the normal mode; a second switch coupled between the gate electrode of the first power saving transistor and the first switching controller, where the second switch may be turned on in the power saving mode; a third switch coupled between a gate electrode of the second transistor and a gate electrode of the second power saving transistor, where the third switch may be turned on in the normal mode; and a fourth switch coupled between the gate electrode of the second power saving transistor and the first switching controller, where the fourth switch may be turned on in the power saving mode.

In an embodiment, the first power saving transistor and the second power saving transistor may be alternately turned on in the normal mode, in which the first and third switches are turned on.

In an embodiment, the second converter may include: a second inductor coupled between a second node and a ground, where the second inductor may generate the second inductor current; a third transistor coupled between an input power source and the second node; a third power saving transistor coupled in parallel to the third transistor, where the third power saving transistor may have a size smaller than a size of the third transistor; a fourth transistor coupled between the second node and a second output end; a fourth power saving transistor coupled in parallel to the fourth transistor, where the fourth power saving transistor may have a size smaller than a size of the fourth transistor; and a second switching controller which controls on/off operations of the third transistor, the fourth transistor, the third power saving transistor and the fourth power saving transistor. In such an embodiment, the third transistor and to the fourth transistor may be alternately turned on in the normal mode, and the third power saving transistor and the fourth power saving transistor may be alternately turned on in the power saving mode.

In an embodiment, the second converter may further include: a fifth switch coupled between a gate electrode of the third transistor and a gate electrode of the third power saving transistor, where the fifth switch may be turned on in the normal mode; a sixth switch coupled between the gate electrode of the third power saving transistor and the second switching controller, where the sixth switch may be turned on in the power saving mode; a seventh switch coupled between a gate electrode of the fourth transistor and a gate electrode of the fourth power saving transistor, where the seventh switch may be turned on in the normal mode; and an eighth switch coupled between the gate electrode of the fourth power saving transistor and the second switching controller, where the eighth switch may be turned on in the power saving mode.

In an embodiment, the third power saving transistor and the fourth power saving transistor may be alternately turned on in the normal mode, in which the fifth and seventh switches are turned on.

In an embodiment, the second converter may change the magnitude of the second power voltage while switching a driving manner thereof in synchronization with the mode control signal in a vertical blank period.

In an embodiment, the second converter may switch a driving manner thereof in synchronization with the mode control signal in a vertical blank period, to the magnitude of the second power voltage may be changed step by step to a power saving mode target level throughout a plurality of vertical blank periods before a driving mode is switched from the normal mode to the power saving mode, and the magnitude of the second power voltage may be changed step by step to a normal mode target level throughout a plurality of vertical blank periods after the driving mode is switched from the power saving mode to the normal mode.

In an embodiment, the mode selector may allow the mode control signal to be enabled in a black image period. In such an embodiment, the second converter may change the magnitude of the second power voltage in the black image period, and switch a driving manner thereof in synchronization with the mode control signal.

In an embodiment, the DC-DC converter may further include a protector which compares a variation in the first power voltage output from the first converter with a preset reference voltage during a black image period in which a driving mode is switched the normal mode and the power saving mode, and shuts down the DC-DC converter if the variation in the first power voltage is larger than the reference voltage.

In an embodiment, switching operations of the first and second converters may be stopped in the black image period. In such an embodiment, the protector may compare the variation in the first power voltage with the reference voltage in a state in which an output end of the first converter and an output end of the second converter are floated.

In an embodiment, the DC-DC converter may further include a protector which compares the second power voltage output from the second converter with a preset reference voltage during a black image period in which a driving mode is switched between the normal mode and the power saving mode, and shuts down the DC-DC converter if the magnitude of the second power voltage is greater than the reference voltage. In such an embodiment, the operation of the second converter may be stopped during at least a portion of the black image period.

According to an embodiment of the disclosure, there is provided a DC-DC converter including: a boost converter which outputs a first power voltage in a normal mode or in a power saving mode based on a first inductor current generated therein, where when the booster converter is in the power saving mode, the booster converter operates in a second driving manner, in which a magnitude of the first inductor current is continuously changed based on a first pulse width modulation ("PWM") signal having a first driving frequency, and when the booster converter is in the power saving mode, the booster converter operates in a second driving manner in which the magnitude of the first inductor current is not changed during a first discontinuous period based on the first PWM signal having a second driving frequency; a first inverting converter which outputs a second power voltage based on a second inductor current generated therein in the normal mode or in the power saving mode, where when the first inverting converter is in the power saving mode, the first inverting converter operates in a third driving manner or a PFM manner which lowers a frequency to in the power saving mode, and when the first inverting convert is in the normal mode, the first inverting converter operates in one of the first driving manner, the second driving manner and the third driving manner, which is determined based on a magnitude of a load of a display panel, where when the first inverting converts operates in the third driving manner, a magnitude of the second inductor current is not changed during a second discontinuous period based on a second PFM signal; and a second inverting converter which does not operate in the power saving mode, where the second inverting converter outputs the second power voltage in the first driving manner or the second driving manner only when the load of the display panel exceeds a preset reference load in the normal mode. In such an embodiment, the second discontinuous period is longer than the first discontinuous period.

In an embodiment, the second driving frequency may be lower than the first driving frequency.

In an embodiment, a magnitude of the second power voltage output from the first inverting converter in the power saving mode may be different from a magnitude of the second power voltage output from the first inverting converter in the normal mode.

According to an embodiment of the disclosure, a display device includes: a display panel including a plurality of pixels, where the display panel displays an image in one of a normal mode and a power saving mode; a data driver which provides a data signal to the display panel; and a DC-DC converter which supplies a first power voltage and a second power voltage lower than the first power voltage to the display panel, and supplies a source driving voltage to the data driver. In such an embodiment, the DC-DC converter includes: a first converter which outputs the first power voltage based on a first inductor current generated by alternately turning on a plurality of transistors therein, where the first converter operates in a first driving manner in the normal mode, and operates in a second driving manner in the power saving mode; and a second converter which outputs the second power voltage based on a second inductor current generated by alternately turning on a plurality of transistors therein, where the second converter operates in a third driving manner in the power saving mode, and a magnitude of the second power voltage in the power saving mode is different from a magnitude of the second power voltage in the normal mode.

In an embodiment, turn-on times of the transistors in the second driving manner may be less than turn-on times of the transistors in the first driving manner during a same period, and turn-on times of the transistors in the third driving manner may be less than turn-on times of the transistors in the second driving manner during the same period.

In an embodiment, when the first converter operates in the first driving manner, the magnitude of the first inductor current may be continuously changed, and when the first converter operates the second driving manner, the magnitude of the first inductor current may not be changed during a predetermined period.

In an embodiment, the second converter may operate in the second driving manner in the normal mode. In such an embodiment, when the second converter operates in the second driving manner, the magnitude of the second inductor current may not be changed during a first discontinuous period, and when the second converter operates in the third driving manner, the magnitude of the second inductor current may not be changed during a second discontinuous period. In such an embodiment, the second discontinuous period may be longer than the first discontinuous period.

BRIEF DESCRIPTION OF THE DRAWINGS

The above and other features of the invention will become more apparent by describing in further detail exemplary embodiments thereof with reference to the accompanying drawings, in which:

FIGS. 6A to 6C are signal diagrams illustrating exemplary embodiments of driving manners in that the second converter of FIG. 5 generates an inductor current;

FIG. 13 is a waveform diagram illustrating an exemplary embodiment of an operation of the DC-DC converter of FIG. 12;

FIGS. 14A and 14B are waveform diagrams illustrating alternative exemplary embodiments of the operation of the DC-DC converter of FIG. 12;

DETAILED DESCRIPTION

Figure 1:
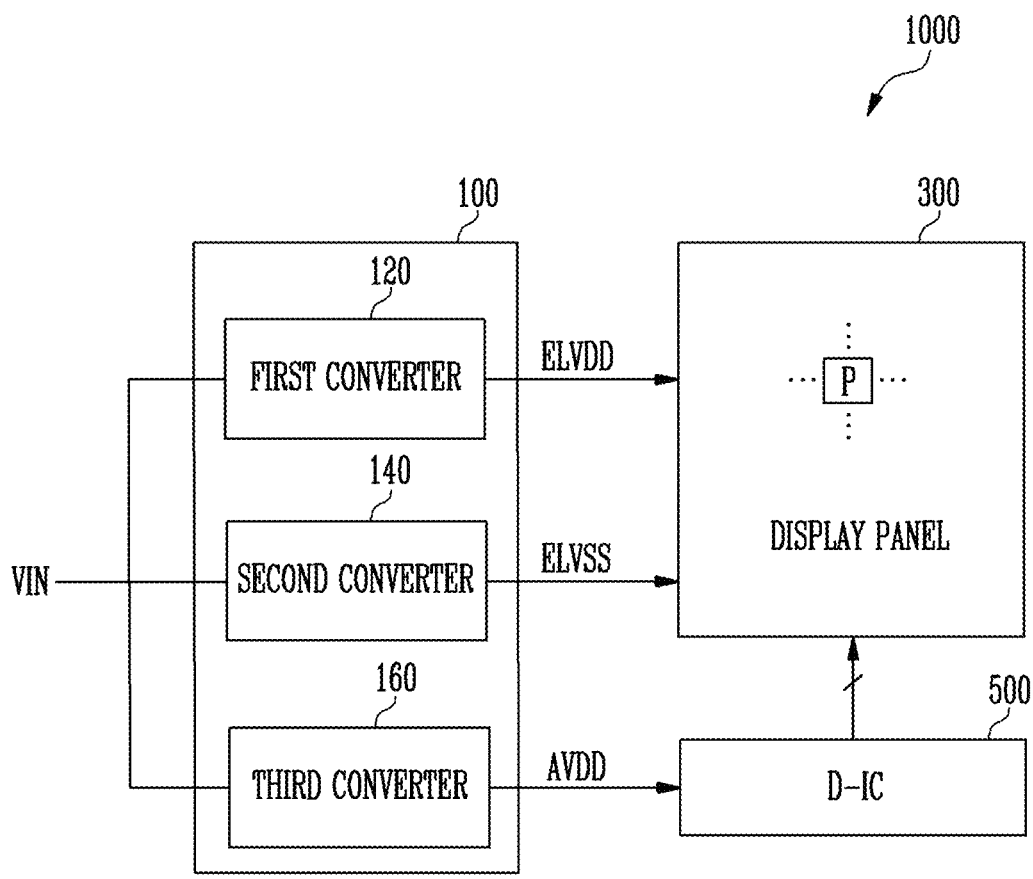
FIG. 1 is a block diagram illustrating a display device according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or"

includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, exemplary embodiments of the disclosure will be described in detail with reference to the accompanying drawings.

FIG. 1 is a block diagram illustrating a display device according to embodiments of the disclosure.

Referring to FIG. 1, the display device 1000 may include a direct current-to-direct current ("DC-DC") converter 100, a display panel 300, and a data driver 500.

The display device 1000 may further include a scan driver (not shown) and a timing controller (not shown) for controlling operations of the DC-DC converter 100, the data driver 500 and the scan driver. In an embodiment, the timing controller and the data driver 500 may be integrated in a single driver integrated circuit ("IC") (referred to as D-IC in FIG. 1) or be directly disposed on the display panel 300. The scan driver may be directly disposed on the display panel 300 or be coupled in an IC form to the display panel 300.

The display device 1000 may be an organic light emitting display device. Alternatively, the display device 1000 may be a liquid crystal display device. However, this is merely illustrative, and the type of the display device 1000 is not limited thereto.

In an embodiment, the display device 1000 may be driven in a normal mode, in which an image is normally displayed, and a power saving mode, in which an image is displayed with a low power. The power saving mode is a driving manner that minimizes power consumption by limiting the maximum luminance of the display panel 300 to a preset luminance or less. In one embodiment, for example, the power saving mode may be an always-on-display ("AOD") mode in which simple display information is always displayed, a predetermined display mode in which a screen is displayed at a very low luminance in a dark environment, or the like.

The DC-DC converter 100 may control or manage the magnitudes and sequences of source voltages ELVDD, ELVSS and AVDD provided to the display panel 300 and the data driver 500, based on an input power source VIN. The source voltages ELVDD, ELVSS and AVDD includes a first power voltage ELVDD and a second power voltage ELVSS, which are a high-potential voltage and a low-potential voltage, respectively, and used to drive pixels P, and a source driving voltage AVDD, which is a voltage used to drive the data driver 500. In an embodiment, the DC-DC converter 100 may include a first converter 120 for converting a voltage of the input power source VIN into the first power voltage ELVDD, a second converter 140 for converting the voltage of the input power source VIN into the second power voltage ELVSS, and a third converter 160 for converting the voltage of the input power source VIN into the source driving voltage AVDD. The first and third converters 120 and 160 may be boost converters, and the second converter 140 may be an inverting buck boost converter.

The first converter 120 may output the first power voltage ELVDD in a first driving manner that generates a first inductor current by allowing a plurality of transistors to be alternately turned on in the normal mode. In an embodiment, the first driving manner may be a driving manner in that the first inductor current (i.e., the magnitude of the first inductor current) is continuously changed based on a first pulse width modulation ("PWM") signal having a first driving frequency. In one embodiment, for example, the first driving manner may be a continuous conduction mode ("CCM") manner.

The first converter 120 may output the first power voltage ELVDD in a second driving manner that generates the first inductor current with turn-on times (e.g., the number of turn-on periods per a unit period) less than those in the first driving manner, in the power saving mode. In an embodiment, the second driving manner may include a first discontinuous period that is a period in which the first inductor current (i.e., the magnitude of the first inductor current) is not changed based on the first PWM signal having a second driving frequency. In one embodiment, for example, the second driving manner may be a discontinuous conduction mode ("DOM") manner. In an embodiment, the second driving frequency may be equal to or lower than the first driving frequency.

In an embodiment, the first inductor current generated in the first driving manner may have a first peak value, and the first inductor current generated in the second driving manner may have a second peak value less than the first peak value.

The period in which the magnitude of the first inductor current is not changed in the power saving mode corresponds to a period in which the switching operation of transistors included in the first converter 120 is stopped. In such an embodiment, the first discontinuous period may correspond to a period in which all the transistors included in the first converter 120 are in a turn-off state.

In such an embodiment, the first converter 120 may output the first power voltage ELVDD while continuously changing the magnitude of the first inductor current in the first driving manner, and output the first power voltage ELVDD while including a period in which the magnitude of the first inductor current is not changed in the second driving manner. Thus, the power consumption caused by the switching may be reduced due to the period in which the magnitude of the first inductor current is not changed in the power saving mode.

In the power saving mode, the second converter 140 may output the second power voltage ELVSS in a third driving manner. The third driving manner may generate a second inductor current (i.e., a current in the second converter 140) with turn-on times less than those in the second driving manner. In an embodiment, the second converter 140 may output the second power voltage ELVSS in the third driving manner that includes a second discontinuous period in which the magnitude of the second inductor current is not changed based on a second PWM signal. The second discontinuous period may correspond to a period in which transistors included in the second converter 140 are all in the turn-off state. In one embodiment, for example, the third driving manner may be a pulse skip mode ("PSM") manner.

Alternatively, the third driving manner may decrease the turn-on times (switching times) of the transistors by lowering a frequency, using a pulse frequency modulation ("PFM") manner. In one embodiment, for example, in the power saving mode, the switching times of the transistors included in the second converter 140 may be decreased by lowering the frequency of a signal for driving the transistors, and the absolute value of the second power voltage ELVSS may be decreased.

In such an embodiment, the second discontinuous period may be longer than the first discontinuous period. Thus, the turn-on times (switching times) of the transistors included in the second converter 140 in the third driving manner is much less than those in the second driving manner. Accordingly, the power consumption of the second converter in the power saving mode may also be reduced.

In an embodiment, in the normal mode, the second converter 140 may be driven in one of the first to third driving manners based on the magnitude of a load (e.g., an emission luminance) of the display panel 300. The second converter 140 may also adjust the magnitude of the second power voltage ELVSS according to the first to third driving manners. In one embodiment, for example, when the second power voltage ELVSS is a negative voltage, the second power voltage ELVSS output in the third driving manner may be greater than that output in the first driving manner. Therefore, the potential difference between the first power voltage ELVDD and the second power voltage ELVSS in the power saving mode may be less than that in the normal mode.

The third converter 160 may operate in the same manner as the second converter 140. In one embodiment, for example, in the normal mode, the third converter 160 may be driven in one of the first to third driving manners based on the magnitude of a load of the display panel 300. In the power saving mode, the third converter 160 may output the source driving voltage AVDD in the third driving manner or in the PFM manner that lowers the frequency.

The display panel 300 displays an image. The display panel 300 may include a plurality of pixels P that operate based on the first power voltage ELVDD, the second power voltage ELVSS, a data signal, a scan signal and the like supplied thereto. In an embodiment, the second power voltage ELVSS may be less (or lower) than the first power voltage ELVDD. In one embodiment, for example, the first power voltage ELVDD may be a positive voltage, and the second power voltage ELVSS may be a negative voltage.

The data driver 500 may supply a data signal to the display panel.

In an embodiment, as described above, the display device 1000 and the DC-DC converter 100 included therein are driven in a driving manner that reduces switching loss of the transistors included in the first to third converters 120, 140 and 160 in the power saving mode, so that the power consumption in the power saving mode may be further reduced.

Figure 2:
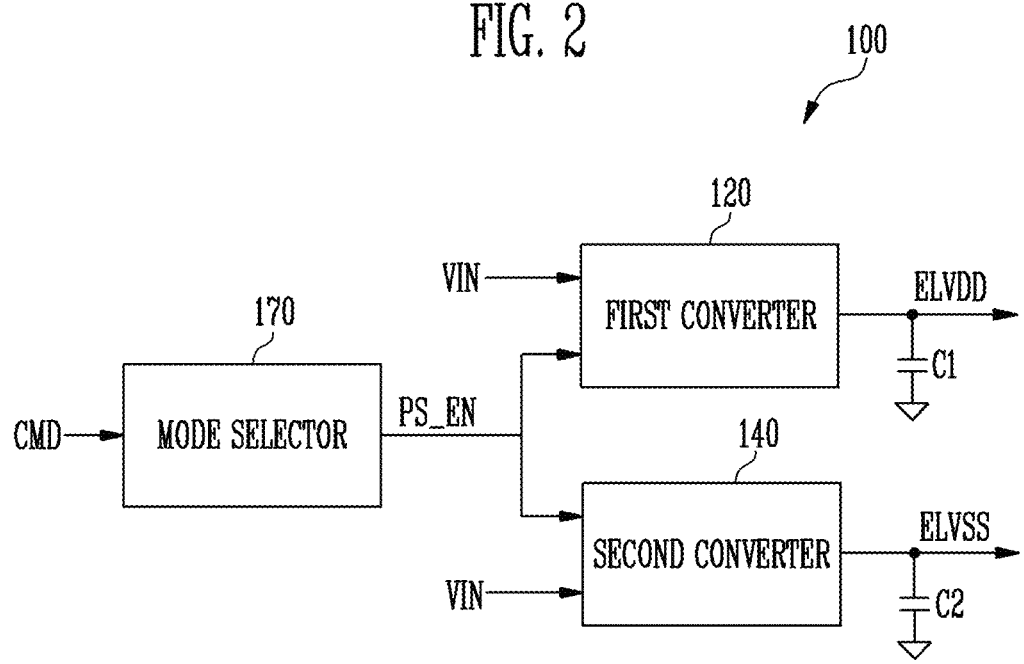
FIG. 2 is a block diagram illustrating a direct current-to-direct current ("DC-DC") converter according to an embodiment of the disclosure.

FIG. 2 is a block diagram illustrating a DC-DC converter according to an embodiment of the disclosure.

Referring to FIG. 2, an embodiment of the DC-DC converter 100 may include a first converter 120, a second converter 140 and a mode selector 170. For convenience of illustration and description, the third converter 160 of FIG. 1 is not shown in FIG. 2, and detailed description thereof will be omitted.

In such an embodiment, the DC-DC converter 100 may operate in one of a normal mode, in which a normal image is displayed, and a power saving mode, in which the displayable maximum luminance is limited, based on a control signal received from the outside.

The first converter 120 may output a first power voltage ELVDD, based on the voltage of an input power source VIN and a mode control signal PS_EN. In the normal mode, the first converter 120 may output the first power voltage ELVDD in a first driving manner that generates a first inductor current by allowing a plurality of transistors to be alternately turned on. In an embodiment, the first converter 120 may output the first power voltage ELVDD in the first driving manner in that the first inductor current is continuously changed based on a first PWM signal having a first driving frequency. The first inductor current is a current flowing through an inductor included in the first converter 120 to determine the first power voltage ELVDD. In one embodiment, for example, the first driving manner may be a CCM manner. The first converter 120 may be driven in only the CCM manner regardless of the load of the display panel in the normal mode to achieve the output stability of the first power voltage ELVDD, which has great influence on pixel emission.

In the power saving mode, the first converter 120 may output the first power voltage ELVDD in a second driving manner that generates the first inductor current with turn-on times less than those in the first driving manner. In an embodiment, the second driving manner may include a first discontinuous period that is a period in which the first inductor current is not changed based on the first PWM signal having a second driving frequency lower than the first driving frequency. In one embodiment, for example, the second driving manner may be a DCM manner.

The second converter 140 may output a second power voltage ELVSS, based on the voltage of the input power source VIN and the mode control signal PS_EN. In the power saving mode, the second converter 140 may output the second power voltage ELVSS in a third driving manner that generates a second inductor current with turn-on times less than those in the second driving manner.

In an embodiment, the second converter 140 may output the second power voltage ELVSS in the third driving manner including a second discontinuous period in which the second inductor current is not changed based on a second PWM signal. The second discontinuous period is longer than the first discontinuous period.

In one embodiment, for example, the third driving manner may be implemented as a PSM manner or a PFM manner.

As the period in which the magnitude of the second inductor current is not changed (i.e., the discontinuous period) is lengthened, the magnitude of the second power voltage ELVSS caused by the second inductor current may be changed step by step. Therefore, the magnitude of the second power voltage ELVSS in the normal mode may be different from that of the second power voltage ELVSS in the power saving mode.

In the normal mode, the second converter 140 may be driven in one of the first driving manner, the second driving manner and the third driving manner according to the magnitude of a load of the display panel. In one embodiment, for example, the second converter 140 may be driven in the first driving manner for high-luminance emission (when the load is large). In such an embodiment, the second converter 140 may be driven in the second driving manner for middle-luminance emission, and the second converter 140 may be driven in the third driving manner for low-luminance emission.

In an embodiment, the driving frequency of the first converter 120 and/or the second converter 140 in the normal mode may be equal to that of the first converter 120 and/or the second converter 140 in the power saving mode. Here, the driving frequency may be a frequency of control signals supplied to gate electrodes of the transistors of the first converter 120 and/or the second converter 140. That is, the switching (turn-on) and inductor current of the transistors may be controlled based on the driving frequency. In one embodiment, for example, the first power voltage ELVDD may be output in the CCM manner of about 1.5 megahertz (MHz) in the normal mode, and output the first power voltage ELVDD in the CDM manner of about 1.5 MHz in the power saving mode. In such an embodiment, since the length of a period, in which the transistors simultaneously have the turn-off state in the DCM manner, is longer than that of a period, in which the transistors simultaneously have the turn-off state in the CCM manner, in one period having the same frequency, the magnitude of an output voltage becomes smaller, and the power consumption in the power saving mode is less than that in the normal mode.

In an alternative embodiment, the driving frequency in the power saving mode may be smaller than that in the normal mode. In one embodiment, for example, the first converter 120 may output the first power voltage ELVDD in the CCM manner of about 1.5 MHz in the normal mode, and output the first power voltage ELVDD in the DCM manner of about 500 kilohertz (KHz) in the power saving mode. In such an embodiment, since the period in which the transistors simultaneously have the turn-off state is longer than that in which the transistors are driven at the same driving frequency, the power consumption in the power saving mode may be less than that in the normal mode.

In an embodiment, the driving frequency in the power saving mode may be decreased to a preset value as the magnitude of the load of the display panel is decreased. In one embodiment, for example, as the magnitude of the load of the display panel is decreased, the driving frequency may be selected in an order of about 500 KHz, about 400 KHz, about 300 KHz, about 200 KHz, and 100 KHz.

In such an embodiment, the DC-DC converter 100 directly controls the second power voltage ELVSS in the power saving mode, such that the setting of the second power voltage ELVSS is relatively free. Thus, the luminance in the power saving mode having a level higher than that of the existing power saving mode may be implemented under an external environment in which ambient illumination is bright. In such an embodiment, the driving manner of the DC-DC converter 100 and/or the adjustment of the magnitude of the second power voltage ELVSS may be relatively easily performed. Accordingly, the maximum luminance in the power saving mode may be flexibly controlled.

The mode selector 170 may provide the mode control signal PS_EN to the first and second converters 120 and 140 such that the first and second converters 120 and 140 are driven in the normal mode or the power saving mode, based on an external command CMD. In one embodiment, for example, a period in which the mode control signal PS_EN is enabled may correspond to the power saving mode, and a period in which the mode control signal PS_EN is disabled may correspond to the normal mode. One of the first to third driving manners may be selected based on the mode control signal PS_EN.

In an embodiment, the mode selector 170 may include a load detector for detecting a load of the display panel. Therefore, in the normal mode, the driving manner may be differently selected based on the load of the display panel.

In an embodiment, in the power saving mode, operations of some components included in the DC-DC converter 100 may be wholly or partially stopped. In one embodiment, for example, operations of a current sensing block, an input/output voltage detection/stabilization block, a PWM/segment comparison block and the like, which are included in the first converter 120 and/or the second converter 140, may be wholly or partially stopped. Accordingly, the supply of power to various functional blocks that are not used in the power saving mode is interrupted, so that unnecessary power consumption may be reduced.

In an embodiment, as described above, the DC-DC converter 100 adaptively selects driving manners of the first converter 120 and the second converter 140 based on the driving mode and the load of the display panel, so that power consumption may be reduced.

Figure 3:
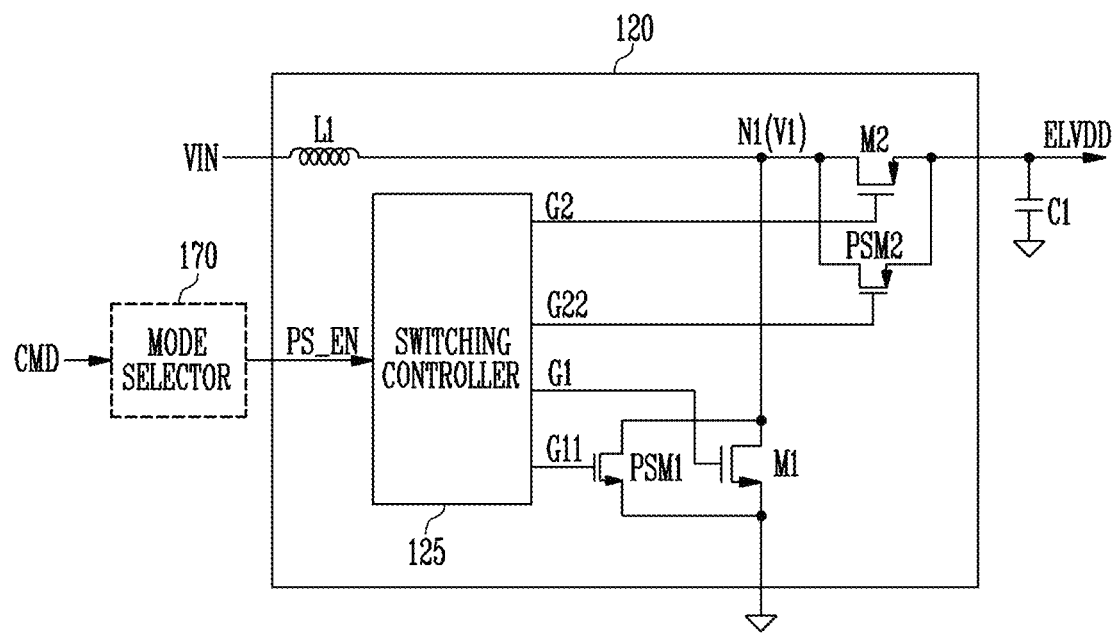
FIG. 3 is a diagram illustrating an embodiment of a first converter included in the DC-DC converter of FIG. 2.
Figure 4:
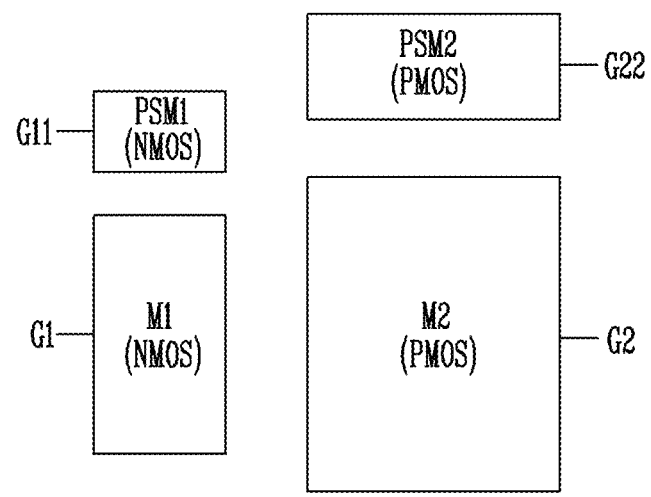
FIG. 4 is a diagram schematically illustrating the sizes of transistors included in the first converter of FIG. 3.

FIG. 3 is a diagram illustrating an exemplary embodiment of the first converter included in the DC-DC converter of FIG. 2. FIG. 4 is a diagram schematically illustrating the sizes of transistors included in the first converter of FIG. 3.

Referring to FIGS. 2 to 4, the first converter 120 may include a switch unit and a first switching controller 125. The switch unit may include a first inductor L1, a first transistor M1, a first power saving transistor PSM1, a second transistor M2, and a second power saving transistor PSM2.

The first converter 120 may output the first power voltage ELVDD by converting the input power source VIN, based on the mode control signal PS_EN. In one embodiment, for example, the first converter 120 may include a boost converter.

The first inductor L1 may be coupled between an input end to which the voltage of the input power source VIN is applied thereto and a first node N1. The first power voltage ELVDD may be controlled based on a first inductor current flowing through the first inductor L1.

The first transistor M1 may be coupled between the first node and a ground. The first transistor M1 may receive a first control signal G1 applied from the first switching controller 125 to be turned on, and control a current to flow through the first inductor L1.

The first power saving transistor PSM1 may be coupled in parallel to the first transistor M1. The first power saving transistor PSM1 may receive a first power saving control signal G11 applied from the first switching controller 125 to be turned on, and control a current to flow through the first inductor L1. The first power saving transistor PSM1 may perform the substantially same operation as the first transistor M1.

In an embodiment, as shown in FIG. 4, the first power saving transistor PSM1 may have a size smaller than that of the first transistor M1. In such an embodiment, the allowable current amount of the first power saving transistor PSM1 may be less than that of the first transistor M1.

The second transistor M2 may be coupled between the first node N1 and a first output end from which the first power voltage ELVDD is output. In the normal mode, the second transistor M2 may be turned on alternately with the first transistor M1. Therefore, after an electromotive force is generated in the first inductor L1 as the first transistor M1 is turned on, the second transistor M2 is turned on, so that a voltage V1 of the first node N1 may be converted into the first power voltage ELVDD based on the input power source VIN, and the first power voltage ELVDD may be output to the first output end. The second transistor M2 may receive a second control signal G2 applied from the first switching controller 125 to be turned on. The first output end may be connected to a first capacitor C1.

The second power saving transistor PSM2 may be coupled in parallel to the second transistor M2. The second power saving transistor PSM2 may receive a second power saving control signal G22 applied from the first switching controller 125 to be turned on. The second power saving transistor PSM2 may be turned on alternately with the first power saving transistor PSM1. The second power saving transistor PSM2 may perform the substantially same operation as the second transistor M2.

In such an embodiment, as shown in FIG. 4, the second power saving transistors PSM2 may have a size smaller than that of the second transistor M2.

In an embodiment, the first and second transistors M1 and M2 may operate (e.g., perform a switching operation) only in the normal mode, and the first and second power saving transistors PSM1 and PSM2 may operate only in the power saving mode. In one embodiment, for example, in the power saving mode, the turn-off state of the first and second transistors M1 and M2 may be maintained by the first and second control signals G1 and G2. In such an embodiment, in the normal mode, the turn-off state of the first and second power saving transistors PSM1 and PSM2 may be maintained by the first and second power saving control signals G11 and G22.

In an alternative embodiment, the first and second transistors M1 and M2 may operate only in the normal mode, and the first and second power saving transistors PSM1 and PSM2 may operate in both of the normal mode and the power saving mode. In one embodiment, for example, the turn-off state of the first transistor M1 may be maintained by the first control signal G1 in the normal mode, and the first power saving transistor PSM1 may perform a switching operation in both of the normal mode and the power saving mode in response to the first power saving control signal G11. In such an embodiment, the turn-off state of the second transistor M2 may be maintained by the second control signal G2, and the second power saving transistor PSM2 may perform a switching operation in both of the normal mode and the power saving mode in response to the second power saving control signal G22.

When a transistor is switching, power loss occurs due to a parasitic capacitance between electrodes of the transistor. The parasitic capacitance may increase as the size of the transistor increase, and the amount of power loss may also increase as the parasitic capacitance increases. Thus, power consumption may be reduced by switching only the first and second power saving transistors PSM1 and PSM2 having small sizes in the power saving mode for power saving.

In one embodiment, for example, as shown in FIG. 4, the first power saving transistor PSM1 may have a size smaller than that of the first transistor M1. In one embodiment, for example, the channel width and/or channel length of the first power saving transistor PSM1 may be smaller than the channel width and/or channel length of the first transistor M1. In an embodiment, the first transistor M1 and the first power saving transistor PSM1 may be n-channel metal oxide semiconductor ("NMOS") transistors.

The second power saving transistor PSM2 may have a size smaller than that of the second transistor M2. In one embodiment, for example, the channel width and/or channel length of the second power saving transistor PSM2 may be smaller than the channel width and/or channel length of the second transistor M2. In an embodiment, the second transistor M2 and the second power saving transistor PSM2 may be p-channel metal oxide semiconductor ("PMOS") transistors.

In one embodiment, for example, the first and second transistors M1 and M2 allow a current of about 600 milliampere (mA) or more to cover up to a luminance of about 750 candela per square meter ($cd/m^2$) to about 800 $cd/m^2$. However, in an alternative embodiment, the first and second transistors M1 and M2 may cover only a luminance of about 100 $cd/m^2$ or less.

In an embodiment, the first converter 120 may output the first power voltage ELVDD in the CCM manner (i.e., the first driving manner) using the first and second transistors M1 and M2 in the normal mode, and output the first power voltage ELVDD in the DCM manner (i.e., the second driving manner) using the first and second power saving transistors PSM1 and PSM2 in the power saving mode.

The first switching controller 125 may control the on/off of the first transistor M1, the second transistor M2, the first power saving transistor PSM1 and the second power saving transistor PSM2. The first and second transistors M1 and M2 may be alternately turned on/off under the control of the first switching controller 125. The first and second power saving transistors PSM1 and PSM2 may be alternately turned on/off under the control of the first switching controller 125.

In an embodiment, the first switching controller 125 may set driving frequencies in the normal mode and the power saving mode to be different from each other. In one embodiment, for example, the first switching controller 125 may control the transistors M1, M2, PSM1 and PSM2 at a driving frequency of about 1.5 MHz in the normal mode, and control the transistors M1, M2, PSM1 and PSM2 at a driving frequency of about 500 KHz in the power saving mode.

In one embodiment, for example, the first switching controller 125 may generate a PWM signal having a predetermined frequency to control the driving frequency of each of the control signals G1, G11, G2, and G22. The PWM signal may be a square wave signal. The generation of the PWM signal and the control of the driving frequency may be performed by various methods known in the art.

In an embodiment, the first driving frequency in the power saving mode may be decreased to a preset value as the magnitude of the load of the display panel is decreased. Thus, as the load of the display panel is decreased, the switching times of the first and second power saving transistors PSM1 and PSM2 may be decreased. Accordingly, the power loss caused by transistor switching may be reduced.

Figure 5:
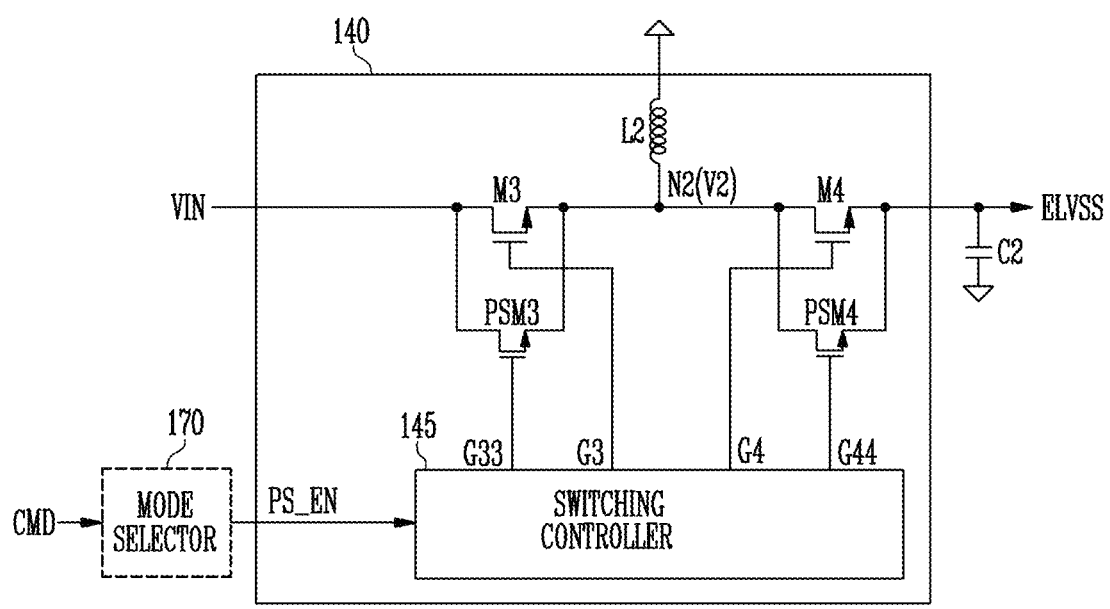
FIG. 5 is a diagram illustrating an exemplary embodiment of a second converter included in the DC-DC converter of FIG. 2.

FIG. 5 is a diagram illustrating an exemplary embodiment of the second converter included in the DC-DC converter of FIG. 2.

Referring to FIGS. 2 and 5, the second converter 140 may include a switch unit and a second switching controller 145. The switch unit may include a second inductor L2, a third transistor M3, a third power saving transistor PSM3, a fourth transistor M4, and a fourth power saving transistor PSM4.

The second converter 140 may output the second power voltage ELVSS by converting the input power source VIN, based on the mode control signal PS_EN. In one embodiment, for example, the second converter 140 may include an inverting buck boost converter.

The second inductor L2 may be coupled between a second node N2 and a ground. The second power voltage ELVSS may be controlled based on a second inductor current flowing through the second inductor L2.

The third transistor M3 may be coupled between the input power source VIN and the second node N2. The third transistor M3 may receive a third control signal G3 applied from the second switching controller 145 to be turned on, and control a current to flow through the second inductor L2.

The third power saving transistor PSM3 may be coupled in parallel to the third transistor M3. The third power saving transistor PSM3 may receive a third power saving control signal G33 applied from the second switching controller 145 to be turned on, and control a current to flow through the second inductor L2. The third power saving transistor PSM3 may perform the substantially same operation as the third transistor M3.

The third power saving transistor PSM3 may have a size smaller than that of the third transistor M3. In such an embodiment, the allowable current amount of the third power saving transistor PSM3 may be smaller than that of the third transistor M3.

The fourth transistor M4 may be coupled between the second node N2 and a second output end. The fourth transistor M4 may be turned alternately with the third transistor M3 in response to a fourth control signal G4 supplied from the second switching controller 145. Therefore, after an electromotive force is generated in the second inductor L2 as the third transistor M3 is turned on, the fourth transistor M4 is turned on, so that a voltage V2 of the second node N2 may be converted into the second power voltage ELVSS based on the input power source VIN, and the second power voltage ELVSS may be output to the second output end. At this time, the second node N2 may be defined as a common node of the third transistor M3, the fourth transistor M4, and the second inductor L2. In an embodiment, the second output end may be connected to a second capacitor C2.

The fourth power saving transistor PSM4 may be coupled in parallel to the fourth transistor M4. The fourth power saving transistor PSM4 may receive a fourth power saving control signal G44 applied from the second switching controller 145 to be turned on. The fourth power saving transistor PSM4 may be turned on alternately with the fourth transistor M4. The fourth power saving transistor PSM4 may perform the substantially same operation as the fourth transistor M4.

The fourth power saving transistor PSM4 may have a size smaller than that of the fourth transistor M4.

In an embodiment, the third and fourth transistors M3 and M4 may operate (e.g. perform a switching operation) only in the normal mode, and the third and fourth power saving transistors PSM3 and PSM4 may operate only in the power saving mode. In one embodiment, for example, in the power saving mode, the turn-off state of the third and fourth transistors M3 and M4 may be maintained by the third and fourth control signals G3 and G4. In such an embodiment, in the normal mode, the turn-off state of the third and fourth power saving transistors PSM3 and PSM4 may be maintained by the third and fourth power saving control signals G33 and G44.

In an alternative embodiment, the third and fourth transistors M3 and M4 may operate only in the normal mode, and the third and fourth power saving transistors PSM3 and PSM4 may be operated in both of the normal mode and the power saving mode. In one embodiment, for example, the turn-off state of the third transistor M3 may be maintained by the third control signal G3 in the normal mode, and the third power saving transistor PSM3 may perform a switching operation in both of the normal mode and the power saving mode in response to the third power saving control signal G33. In such an embodiment, the turn-off state of the fourth transistor M4 may be maintained by the fourth control signal G4, and the fourth power saving transistor PSM4 may perform a switching operation in both of the normal mode and the power saving mode in response to the fourth power saving control signal G44.

In an embodiment, the second converter 140 may output the second power voltage ELVSS by selecting one of the first to third driving manners using the third and fourth transistors M3 and M4 in the normal mode, and output the second power voltage ELVSS in the third driving manner using the third and fourth power saving transistors PSM3 and PSM4 in the power saving mode. Here, the first driving manner may be the CCM manner, and the second driving manner may be the DCM manner. The third driving manner may be the PSM manner or the PFM manner.

The driving manner of the second converter 140 in the normal mode may be selectively used based on the load of the display panel. In the case of high-luminance driving in which the load of the display panel is large, the second converter 140 may output the second power voltage ELVSS in the first driving manner (e.g., the CCM manner). In the case of middle-luminance driving in which the load of the display panel is smaller than a preset reference load, the second converter 140 may output the second power voltage ELVSS in the second driving manner (e.g., the DCM manner). In the case of low-luminance driving in which the load of the display panel is smaller than the preset reference load, the second converter 140 may output the second power voltage ELVSS in the third driving manner (e.g., the CCM manner).

The second switching controller 145 may control the on/off of the third transistor M3, the fourth transistor M4, the third power saving transistor PSM3 and the fourth power saving transistor PSM4. The third and fourth transistors M3 and M4 may be alternately turned on/off under the control of the second switching controller 145. The third and fourth power saving transistors PSM3 and PSM4 may be alternately turned on/off under the control of the second switching controller 145.

In an embodiment, the second switching controller 145 may set driving frequencies in the normal mode and the power saving mode to be different from each other. In such an embodiment, the first driving frequency in the power saving mode may be decreased to a preset value as the magnitude of the load of the display panel is decreased. The switching times (turn-on times per a unit period) of the transistors M3, M4, PSM3 and PSM4 in the power saving mode are decreased by the second switching controller 145, so that the power loss caused by transistor switching may be reduced.

Figure 6B:
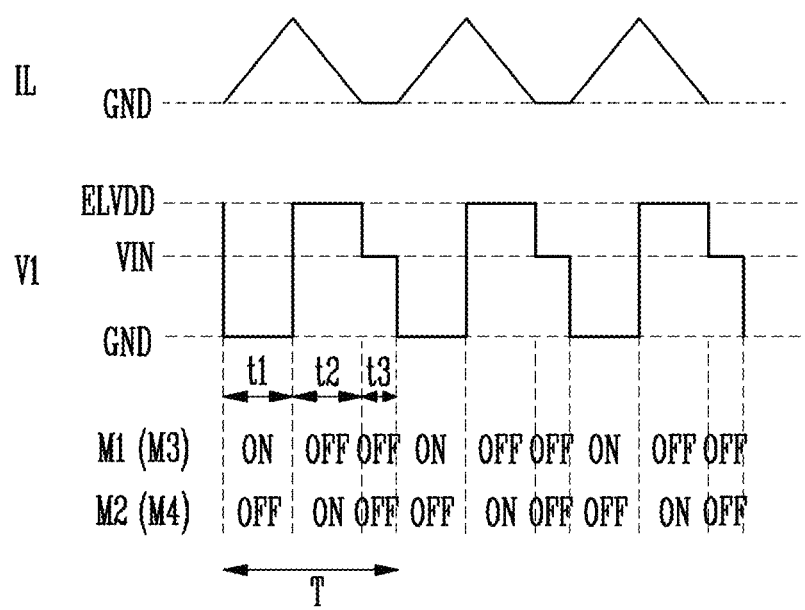

FIGS. 6A to 6C are signal diagrams illustrating exemplary embodiments of driving manners in that the second converter of FIG. 5 generates an inductor current.

Referring to FIGS. 2, 3 and 6A to 6C, the first converter 120 may operate in the first driving manner in the normal mode, and operate in the second driving manner in the power saving mode. The second converter 140 may operate in one of the first to third driving manners in the normal mode, and operate in the third driving manner in the power saving mode.

In FIGS. 6A to 6C, an embodiment in which the first converter 120 of FIG. 3 operates in the first to third driving manners will be described. The second converter 140 may output the second power voltage ELVSS through the substantially same switching operation as the first converter 120.

The first driving manner may generate a first inductor current IL by alternately turning on the first and second transistors M1 and M2. In an embodiment, as shown in FIG.

6A, on/off operations of the first and second transistors M1 and M2 in a predetermined switching period T may be repeated. In one embodiment, for example, in the switching period T, the turn-on state period of the first transistor M1 and the turn-on state period of the second transistor M2 do not overlap with each other.

When the first transistor M1 is turned on (t1), the voltage V1 of the first node N1 may have a ground level GND, and the magnitude of the first inductor current IL may be increased by the difference between the voltage of the input end and the voltage V1 of the first node N1.

When the first transistor M1 is turned off and the second transistor M2 is turned on (t2), the voltage V1 of the first node N1 may be increased to have the level of the first power voltage ELVDD, and the magnitude of the first inductor current IL may be decreased by the difference between the voltage of the input end and the voltage V1 of the first node N1.

As the switching period is repeated, the magnitude of the first inductor current IL may be continuously changed. In one embodiment, for example, the first driving manner may be the CCM manner. Since the first driving manner minimizes output ripples, the first driving manner has high output stability.

In an embodiment, as shown in FIG. 6B, the second driving manner may include a period in which the first and second transistors M1 and M2 are simultaneously turned off in one switching period T (hereinafter, referred to as a first discontinuous period t3). At this time, the voltage V1 of the first node N1 may maintain the voltage of the input power source VIN. Since one end of the first inductor L1 is opened, the current maintains a ground level GND, and the first inductor current IL is not changed during the first discontinuous period t3. In one embodiment, for example, the peak value of the first inductor current IL in the second driving manner may be smaller than that of the first inductor current IL in the first driving manner. In one embodiment, for example, the second driving manner may be the DCM manner.

The first converter 120 may adjust the driving frequency in the second driving manner according to the load of the display panel. As the magnitude of the driving frequency is decreased based on the same time, the switching times (turn-on times) of the first and second transistors M1 and M2 may be decreased. Thus, the power loss caused by the parasitic capacitance due to the switching operations of the first and second transistors M1 and M2 may be reduced.

As shown in FIG. 6C, the third driving manner may include a second discontinuous period t4 in which the first and second transistors M1 and M2 are simultaneously turned off in one switching period. The second discontinuous period t4 may be longer than the first discontinuous period t3 in the second driving manner. In an embodiment, the third driving manner may skip a partial switching period. In such an embodiment, the switching of the first and second transistors M1 and M2 may be skipped, and the first inductor current IL may not flow. Therefore, the amplitude of the first inductor current IL in the third driving manner may be smaller than that of the first inductor current IL in the second driving manner. In one embodiment, for example, the third driving manner may be the PSM manner.

Since the third driving manner skips the switching operation of the first and second transistors M1 and M2 in a predetermined period, the total switching times (turn-on times) may be decreased. Thus, the power loss caused by the parasitic capacitance due to the switching operations of the first and second transistors M1 and M2 may be reduced.

The operation of the second converter 140 is substantially identical to the above-described operations, and any repetitive detailed description thereof will be omitted.

Figure 7:
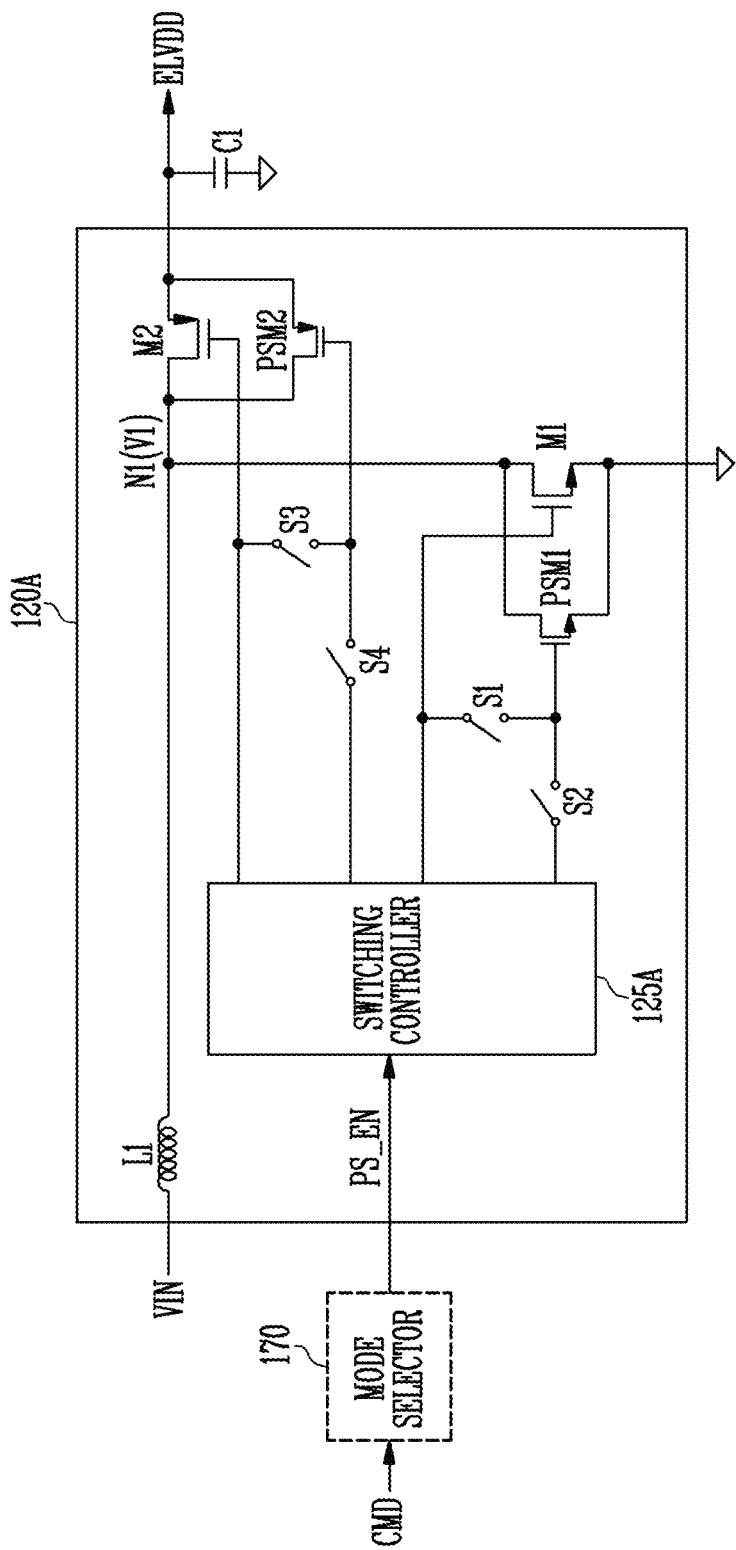
FIG. 7 is a diagram illustrating an alternative exemplary embodiment of the first converter included in the DC-DC converter of FIG. 2.

FIG. 7 is a diagram illustrating an alternative exemplary of the first converter included in the DC-DC converter of FIG. 2.

The first converter 120A of FIG. 7 may be substantially the same as the first converter of FIG. 3, except for first to fourth switches S1 to S4. In FIG. 7, components identical to those described with reference to FIG. 3 are designated by like reference numerals, and any repetitive detailed description thereof will be omitted.

Referring to FIGS. 3 and 7, an embodiment of the first converter 120A may include a first inductor L1, a first transistor M1, a first power saving transistor PSM1, a second transistor M2, a second power saving transistor PSM2, first to fourth switches S1, S2, S3 and S4, and a first switching controller 125A.

The first inductor L1 may be coupled between an input end to which the voltage of the input power source VIN is applied thereto and a first node N1. The first transistor M1 may be coupled between the first node N1 and a ground. The first power saving transistor PSM1 may be coupled in parallel to the first transistor M1. The second transistor M2 may be coupled between the first node N1 and a first output end from which the first power voltage ELVDD is output. The second power saving transistor PSM2 may be coupled in parallel to the second transistor M2.

In such an embodiment, the size of the first power saving transistor PSM1 may be smaller than that of the first transistor M1, and the size of the second power saving transistor PSM2 may be smaller than that of the second transistor M2.

The first switch S1 may be coupled between a gate electrode of the first transistor M1 and a gate electrode of the first power saving transistor PSM1. The first switch S1 may be turned on in the normal mode in response to a control signal supplied from the first switching controller 125A. The first switch S1 is in a turn-off state in the power saving mode. Accordingly, both of the first transistor M1 and the first power saving transistor PSM1 may perform a switching operation in the normal mode.

The second switch S2 may be coupled between the gate electrode of the first power saving transistor PSM1 and the first switching controller 125A. The second switch S2 may be turned on in the power saving mode. The second switch S2 is in the turn-off state in the power saving mode. Accordingly, in the power saving mode, the first transistor M1 has the turn-off state, and only the first power saving transistor PSM1 may perform a switching operation. The second switch S2 is in the turn-off state in the normal mode.

The third switch S3 may be coupled between a gate electrode of the second transistor M2 and a gate electrode of the second power saving transistor PSM2. The third switch S3 may be turned on the normal mode in response to the control signal supplied from the first switching controller 125A. The third switch S3 has the turn-off state in the power saving mode. Accordingly, both of the second transistor M2 and the second power saving transistor PSM2 may perform a switching operation in the normal mode.

The fourth switch S4 may be coupled between the gate electrode of the second power saving transistor PSM2 and the first switching controller 125A. The fourth switch S4 may be turned on in the power saving mode. The third switch S3 is in the turn-off state in the power saving mode. Accordingly, in the power saving mode, the second transistor M2 has the turn-off state, and only the second power saving transistor PSM2 may perform a switching operation. The fourth switch S4 is in the turn-off state in the normal mode.

In an embodiment, in the power saving mode, the first switching controller 125A does not supply the control signal to the first transistor M1 and the second transistor M2.

In an embodiment, as described above, the first power voltage ELVDD is output by the first and second power saving transistor PSM1 and PSM2 having small sizes in the power saving mode, so that the power consumption caused by the parasitic capacitance due to the switching operations of the first and second transistors M1 and M2 may be reduced.

Figure 8:
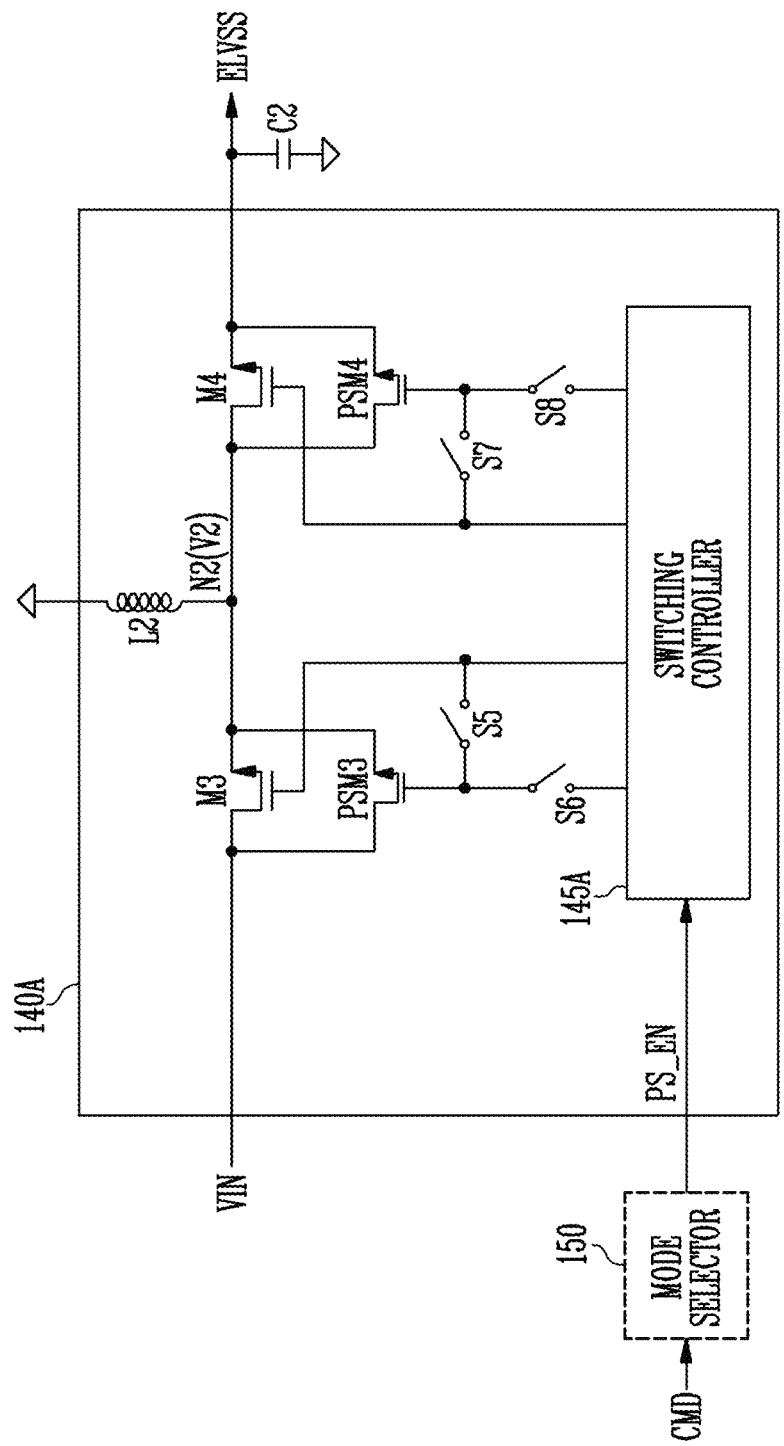
FIG. 8 is a diagram illustrating an alternative exemplary embodiment of the second converter included in the DC-DC converter of FIG. 2.

FIG. 8 is a diagram illustrating an alternative exemplary embodiment of the second converter included in the DC-DC converter of FIG. 2.

The second converter 140A of FIG. 8 may be substantially the same as the second converter of FIG. 5, except for fifth to eighth switches S5 to S8. In FIG. 8, components identical to those described with reference to FIG. 5 are designated by like reference numerals, and any repetitive detailed description thereof will be omitted.

Referring to FIGS. 5 and 8, an embodiment of the second converter 140A may include a second inductor L2, a third transistor M3, a third power saving transistor PSM3, a fourth transistor M4, a fourth power saving transistor PSM4, fifth to eighth switches S5, S6, S7 and S8, and a second switching controller 145A.

The size of the third power saving transistor PSM3 may be smaller than that of the third transistor M3, and the size of the third power saving transistor PSM3 may be smaller than that of the fourth transistor M4.

The fifth switch S5 may be coupled between a gate electrode of the third transistor M3 and a gate electrode of the third power saving transistor PSM3. The fifth switch S5 may be turned on in the normal mode in response to a control signal supplied from the second switching controller 145A. The fifth switch S5 is in the turn-off state in the power saving mode. Accordingly, both of the third transistor M3 and the third power saving transistor PSM3 may perform a switching operation in the normal mode.

The sixth switch S6 may be coupled between the gate electrode of the third power saving transistor PSM3 and the second switching controller 145A. The sixth switch S6 may be turned on in the power saving mode. The fifth switch S5 is in the turn-off state in the power saving mode. Accordingly, in the power saving mode, the third transistor M3 has the turn-off state, and only the third power saving transistor PSM3 can perform a switching operation. The sixth switch S6 is in the turn-off state in the normal mode.

The seventh switch S7 may be coupled between a gate electrode of the fourth transistor M4 and a gate electrode of the fourth power saving transistor PSM4. The seventh switch S7 may be turned on in the normal mode. The seventh switch S7 is in the turn-off state in the power saving mode. Accordingly, both of the fourth transistor M4 and the fourth power saving transistor PSM4 may perform a switching operation in the normal mode.

The eighth switch S8 may be coupled between the gate electrode of the fourth power saving transistor PSM4 and the second switching controller 145A. The eighth switch S8 may be turned on in the power saving mode. Accordingly, in the power saving mode, the fourth transistor M4 has the turn-off state, and only the fourth power saving transistor PSM4 can perform a switching operation.

In an embodiment, in the power saving mode, the second switching controller 145A does not supply the control signal to the third transistor M3 and the fourth transistor M4.

In such an embodiment, as described above, the second power voltage ELVSS of which magnitude is adjusted by the third and fourth power saving transistors PSM3 and PSM4 having small sizes is output in the power saving mode, so that the power consumption caused by the parasitic capacitance due to the switching operations of the third and fourth transistors M3 and M4 may be reduced.

Figure 9:
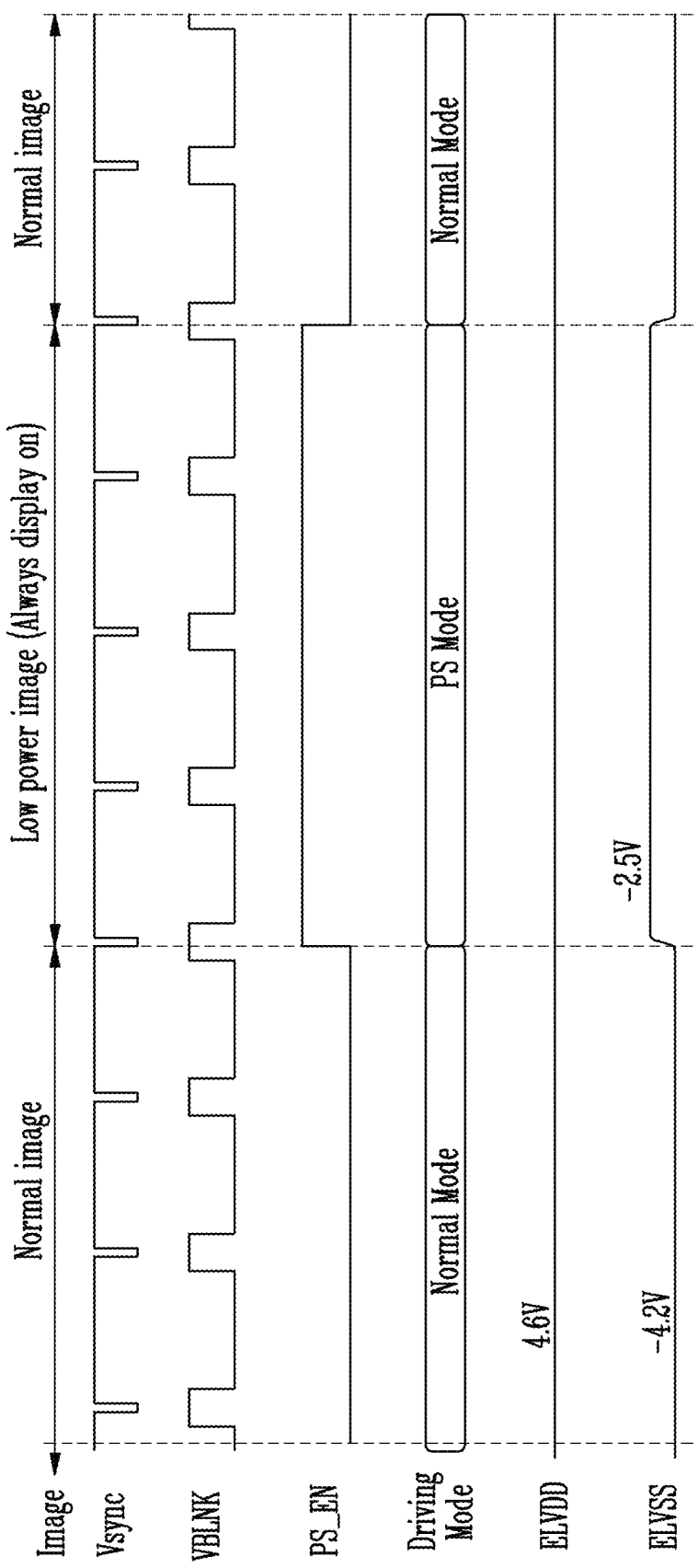
FIG. 9 is a waveform diagram illustrating an exemplary embodiment of an operation of the DC-DC converter of FIG. 2.

FIG. 9 is a waveform diagram illustrating an exemplary embodiment of an operation of the DC-DC converter of FIG. 2.

Referring to FIGS. 2 and 9, an embodiment of the DC-DC converter 100 may operate in the power saving mode during an enable period of the mode control signal PS_EN, and operate in the normal mode during a disable period of the mode control signal PS_EN.

In the normal mode, the display device may display a normal image. In the power saving mode, the display device may display an AOD image, e.g., an image such as a clock on a screen.

In an embodiment, the mode control signal PS_EN may perform transition in a vertical blank period VBLNK. In addition, the enable period of the mode control signal PS_EN may correspond to the power saving mode. In an embodiment, the disable period of the mode control signal PS_EN may correspond to the normal mode. The vertical blank period VBLNK is a black period, and may overlap with a vertical synchronization signal Vsync.

The driving manners of the first and second converters 120 and 140 may be switched in the vertical blank period VBLNK. In one embodiment, for example, when the mode of the display device is switched from the normal mode to the power saving mode, the driving manner of the first converter 120 may be switched from the first driving manner to the second driving manner, and the driving manner of the second converter 140 may be switched from the first or second driving manner to the third driving manner. In such an embodiment, when the mode of the display device is switched from the power saving mode to the normal mode, the driving manner of the first converter 120 may be switched from the second driving manner to the first driving manner, and the driving manner of the second converter 140 may be switched from the third driving manner to the first or second driving manner. In an embodiment, the switching of the driving manners of the first and second converters 120 and 140 may be performed in synchronization with the mode control signal PS_EN. In such an embodiment, the magnitude of the second power voltage ELVSS may also be changed in the vertical blank period VBLNK. In an embodiment, the second power voltage ELVSS may be changed in synchronization with the mode control signal PS_EN.

Therefore, the magnitude of the second power voltage ELVSS and the driving manner may be changed together in the vertical blank period VBLNK. The magnitude of the second power voltage ELVSS in the power saving mode may be larger than that of the second power voltage ELVSS in the normal mode.

Accordingly, in such an embodiment, mode switching and fast switching of driving manners are implemented without using any black image period that occupies a separate image frame.

Figure 10:
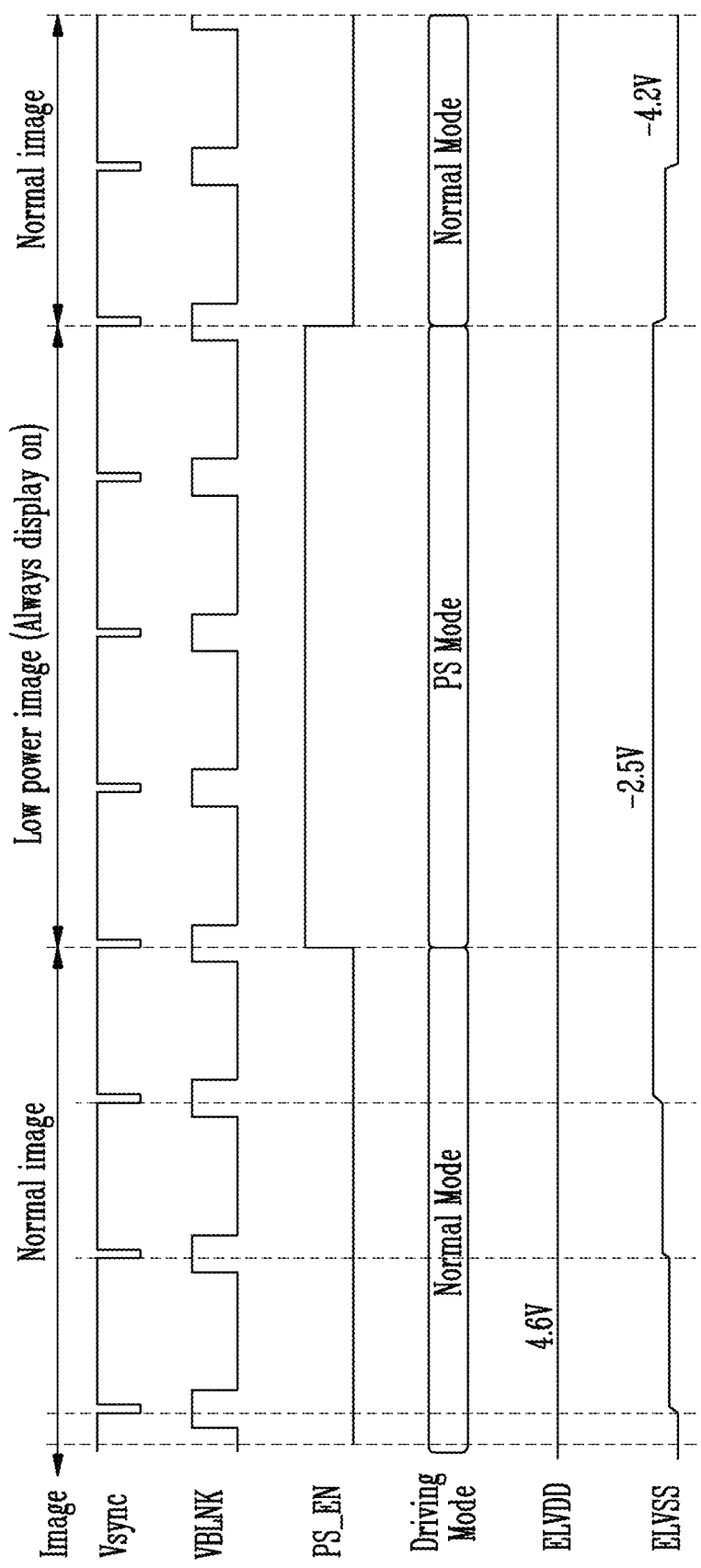
FIG. 10 is a waveform diagram illustrating an alternative exemplary embodiment of the operation of the DC-DC converter of FIG. 2.

FIG. 10 is a waveform diagram illustrating an alternative exemplary embodiment of the operation of the DC-DC converter of FIG. 2.

In FIG. 10, components identical to those described with reference to FIG. 9 are designated by like reference numerals, and any repetitive detailed description thereof will be omitted.

Referring to FIGS. 2 and 10, the enable period of the mode control signal PS_EN may correspond to the power saving mode, and the disable period of the mode control signal PS_EN may correspond to the normal mode.

The switching of driving manners of the first and second converters 120 and 140 may be performed in synchronization with the mode control signal PS_EN. In one embodiment, for example, when the level of the mode control signal PS_EN is changed from a disable level to an enable level, the driving manner of the second converter 140 may be switched to the PSM manner. In such an embodiment, when the level of the mode control signal PS_EN is changed from the enable level to the disable level, the driving manner of the second converter 140 may be switched to the DCM or CCM manner.

When the mode of the display device is switched from the normal mode to the power saving mode, the magnitude of the second power voltage ELVSS may be changed step by step to a power saving mode target level throughout a plurality of vertical blank periods VBLNK before the switching of driving manners of the first and second converters 120 and 140. In one embodiment, for example, the power saving mode target level may be above −2.5 V as shown in FIG. 10. In such an embodiment, the second power voltage ELVSS and the luminance of the display panel may be gradually and gently changed before the display device enters into the power saving mode.

In such an embodiment, when the mode of the display device is switched from the power saving mode to the normal mode, the magnitude of the second power voltage ELVSS may be changed step by step to a normal mode target level throughout a plurality of vertical blank periods VBLNK after the switching of driving manners of the first and second converters 120 and 140. In one embodiment, for example, the normal mode target level may be about −4.2 V. In such an embodiment, the second power voltage ELVSS and the luminance of the display panel may be gradually and gently changed before the display device enters into the normal mode.

However, this is merely exemplary, and alternatively, the second power voltage ELVSS and the luminance of the display panel may be gradually gently changed only in one of before the display device enters into the power saving mode and before the display device enters into the normal mode.

In such an embodiment, as described above, the second power voltage ELVSS is effectively prevented from being rapidly changed in mode switching, so that a display defect such as flickering may be removed.

Figure 11:
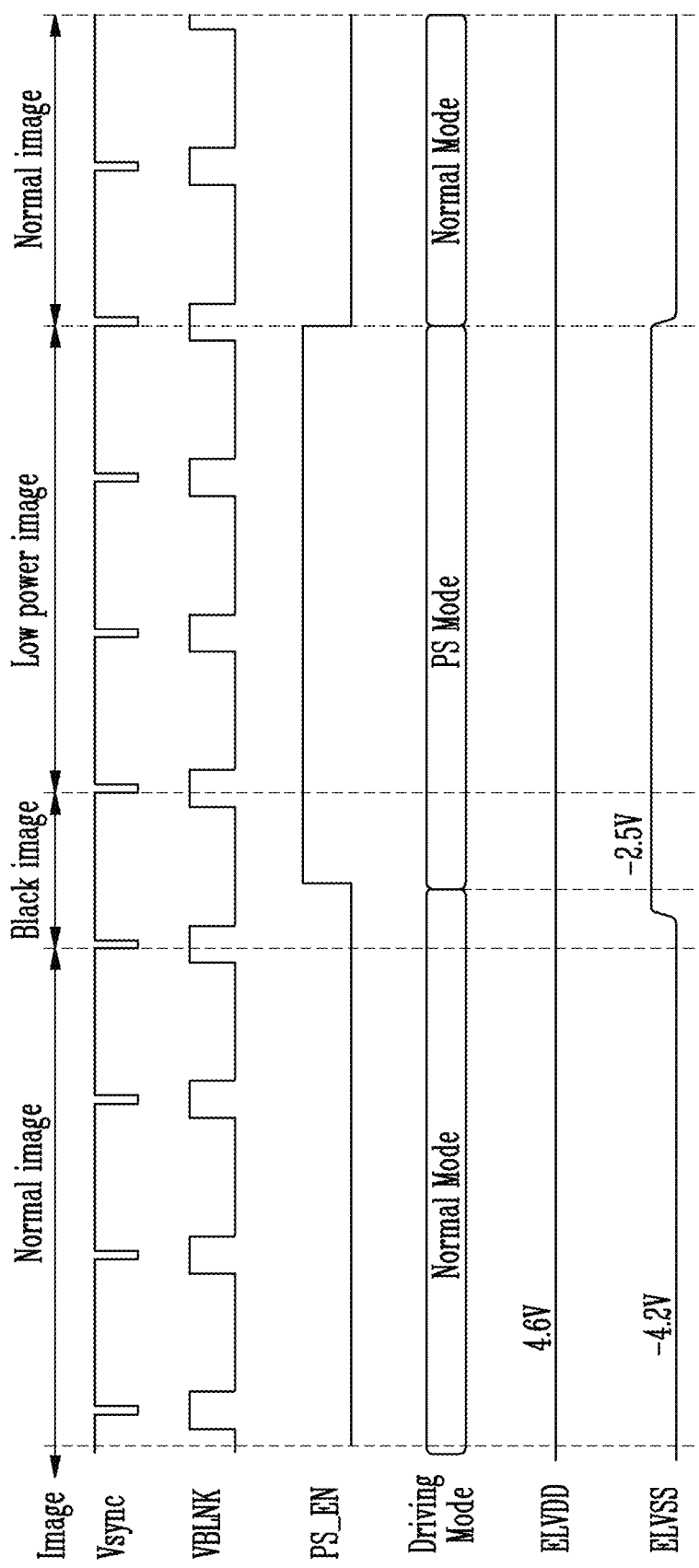
FIG. 11 is a waveform diagram illustrating another alternative exemplary embodiment of the operation of the DC-DC converter of FIG. 2.

FIG. 11 is a waveform diagram illustrating another alternative exemplary of the operation of the DC-DC converter of FIG. 2.

In FIG. 11, components identical to those described with reference to FIG. 9 are designated by like reference numerals, and any repetitive detailed description thereof will be omitted.

Referring to FIGS. 2 and 11, the enable period of the mode control signal PS_EN may correspond to the power saving mode, and the disable period of the mode control signal PS_EN may correspond to the normal mode.

In an embodiment, the mode switching of the DC-DC converter may be performed in a black image period. The black image period is a period in which a black image is displayed as black data is applied to the display device. In one embodiment, for example, the black image period may correspond to one frame period. However, this is merely exemplary, and alternatively, the black image period may correspond to a plurality of frame periods.

The mode selector 170 may allow the mode control signal PS_EN to be enabled in the black image period. The second converter 140 may change the magnitude of the second power voltage ELVSS in the black image period, and the driving manner of the second converter 140 may be switched in synchronization with the mode control signal PS_EN in the black image period. In an embodiment, the driving manner of the first converter 120 may also be switched in synchronization with the mode control signal PS_EN.

The black image period may be inserted into at least one of a period in which the mode of the display device is switched from the normal mode to the power saving mode and a period in which the mode of the display device is switched from the power saving mode to the normal mode.

In an embodiment, a short-circuit detection and shutdown operation of the DC-DC converter may be additionally performed in the black image period.

Figure 12:
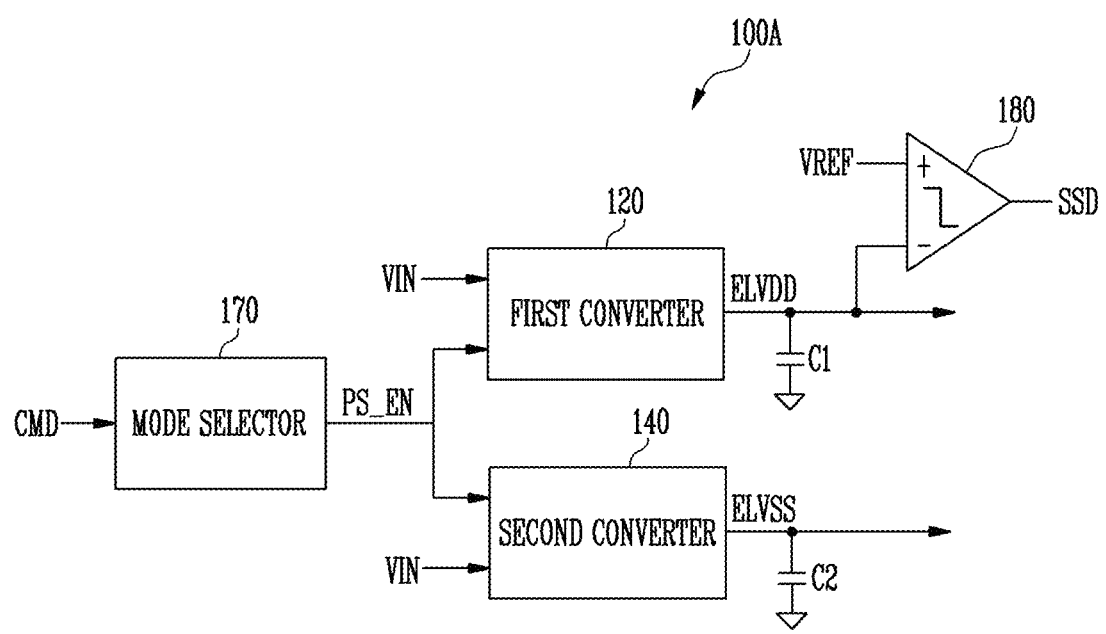
FIG. 12 is a diagram illustrating a DC-DC converter according to an alternative embodiment of the disclosure.
Figure 14B:
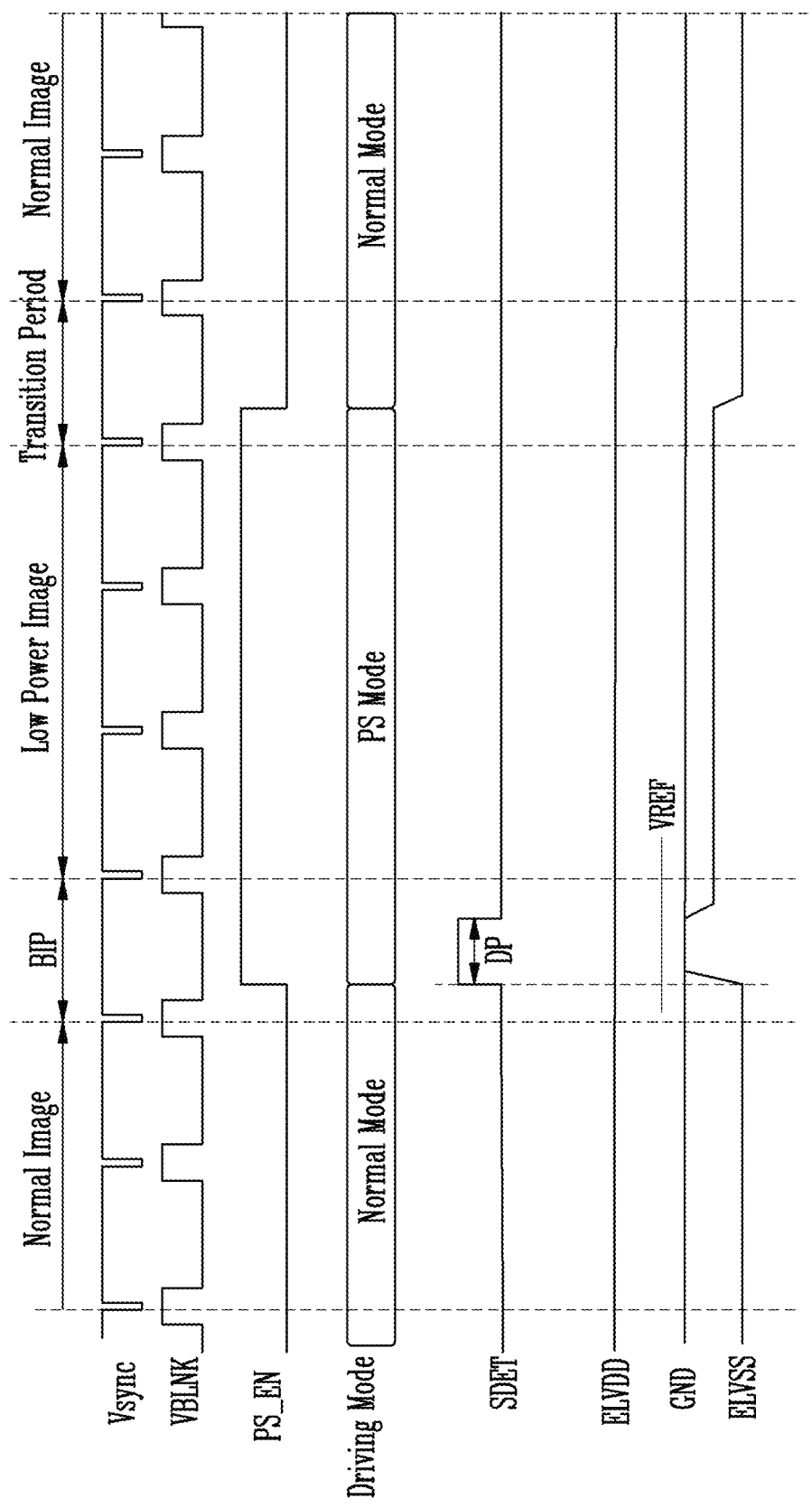

FIG. 12 is a diagram illustrating a DC-DC converter according to an alternative embodiment of the disclosure. FIG. 13 is a waveform diagram illustrating an exemplary embodiment of an operation of the DC-DC converter of FIG. 12. FIGS. 14A and 14B are waveform diagrams illustrating alternative exemplary embodiments of the operation of the DC-DC converter of FIG. 12.

The DC-DC converter 100A of FIG. 12 may be substantially the same as the DC-DC converter of FIG. 2, except for a protector 180. In FIG. 12, components identical to those described with reference to FIG. 2 are designated by like reference numerals, and any repetitive detailed description thereof will be omitted.

Referring to FIGS. 2 and 12 to 14B, an embodiment of the DC-DC converter 100A may include a first converter 120, a second converter 140, a mode selector 170, and the protector 180.

The first converter 120 may output the first power voltage ELVDD in the first driving manner in the normal mode, and output the first power voltage ELVDD in the second driving manner in the power saving mode.

The second converter may output the second power voltage ELVSS in one of the first to third driving manners in the normal mode, and output the second power voltage ELVSS in the third driving manner in the power saving mode.

The mode selector 170 may provide the mode control signal PS_EN to the first and second converters 120 and 140 such that the first and second converters 120 and 140 are driven in the normal mode or the power saving mode, based on the external command CMD.

The protector 180 may perform a short-circuit detection operation, based on a short-circuit detection signal SDET. The protector 180 may compare a variation in the first power voltage ELVDD output from the first converter 120 with a preset reference voltage VREF during a black image period BIP in which the driving mode is switched between the normal mode and the power saving mode. In one embodiment, for example, the protector 180 may perform the short-circuit detection operation during a detection period in which the short-circuit detection signal SDET is enabled in the black image period BIP. When the variation in the first power voltage ELVDD is larger than the reference voltage VREF, the protector 180 may output a shutdown signal SSD. The DC-DC converter 100A may be shut down by the shutdown signal SSD.

In an embodiment, as shown in FIG. 13, the switching operations of the first converter 120 and the second converter 140 may be stopped in the detection period DP of the black image period BIP. Accordingly, the output end of the first converter 120 and the output end of the second converter 140 may be floated. That is, the output end of the first converter 120 and the output end of the second converter 140 become a high impedance ("Hi-Z") state.

At this time, in a normal case, the magnitude of the first power voltage ELVDD is not smaller than a voltage variation set to a reference voltage VREF (e.g., a first reference voltage VREF1 in FIG. 13) due to a voltage stored in the first capacitor C1 coupled to the output end of the first converter 120.

However, when a short circuit occurs in the display panel or the DC-DC converter 100A, the variation in the first power voltage ELVDD may be greater than that in the first reference voltage VREF1. At this time, the protector 180 may output the shutdown signal SSD.

However, this is merely exemplary, and alternatively, the protector 180 may be coupled to the output end of the second converter 140 to detect the short circuit of a circuit by sensing a change in the second power voltage ELVSS. In one embodiment, for example, when a line for transferring the second power voltage ELVSS and a line for transferring the first power voltage ELVDD are short-circuited with each other, the second power voltage ELVSS may be considerably increased. In such an embodiment, as shown in FIG. 13, the protector 180 may detect a short circuit by sensing a change in the second power voltage ELVSS and comparing the sensed change in the second power voltage ELVSS with a second reference voltage VREF2.

In an embodiment, the operation of the second converter 140 may be stopped in the black image period BIP. The protector 180 may be coupled to the output end of the second converter 140 to sense a change in the second power voltage ELVSS and compare the sensed change in the second power voltage ELVSS with the reference voltage (VREF of FIGS. 14A and 14B). In one embodiment, for example, the operation of only the second converter 140 may be stopped in the detection period DP of the black image period BIP. Therefore, the output end of the second converter 140 may be floated.

In the normal case, as shown in FIG. 14B, the second power voltage ELVSS may not be allowed to be larger than the reference voltage VREF. Accordingly, the second power voltage ELVSS may be normally output in the power saving mode after the black image period BIP.

As shown in FIG. 14A, when a short circuit occurs, the second power voltage ELVSS may exceed the reference voltage VREF. At this time, the DC-DC converter 100A may be shut down.

In an embodiment, as described above, the black image period BIP is inserted just before the display device enters into the power saving mode from the normal mode, so that a short-circuit test may be performed during the black image period BIP.

Figure 15:
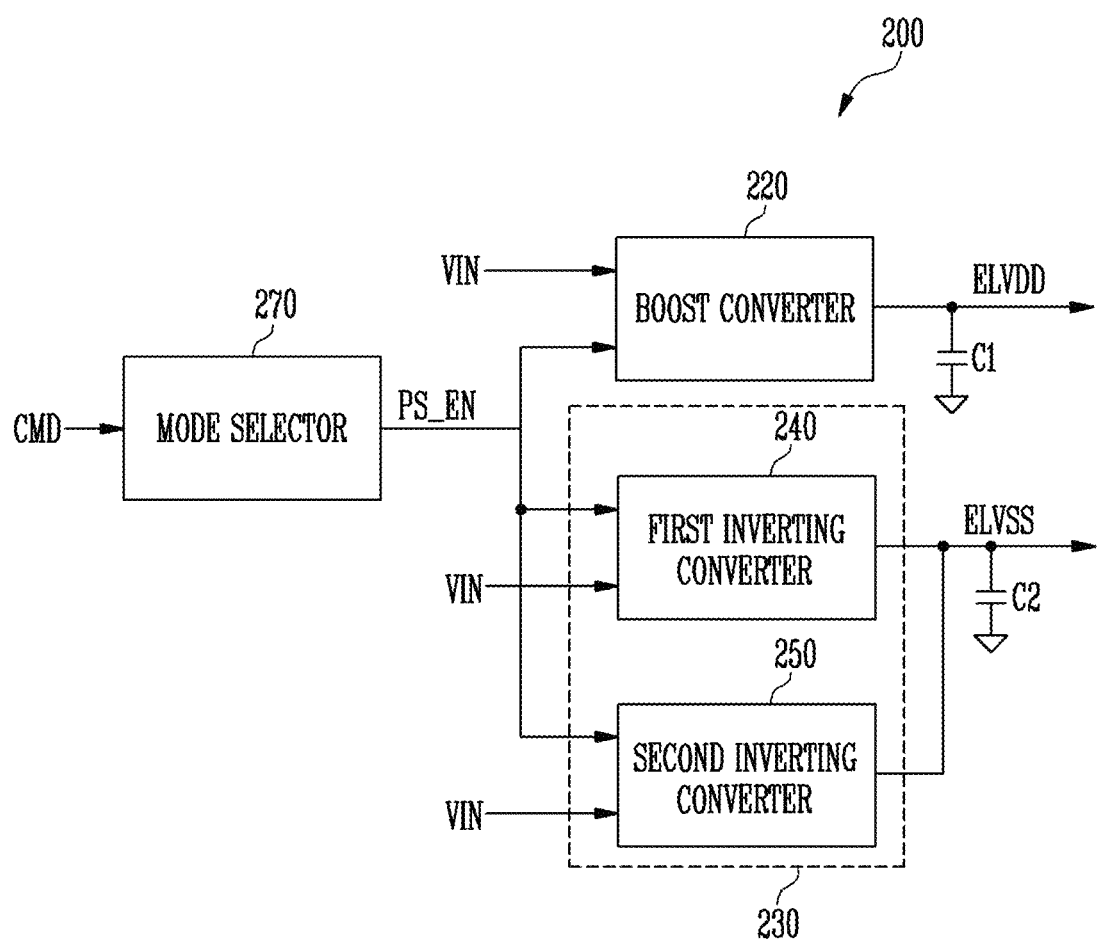
FIG. 15 is a diagram illustrating a DC-DC converter according to another alternative embodiment of the disclosure.
Figure 16:
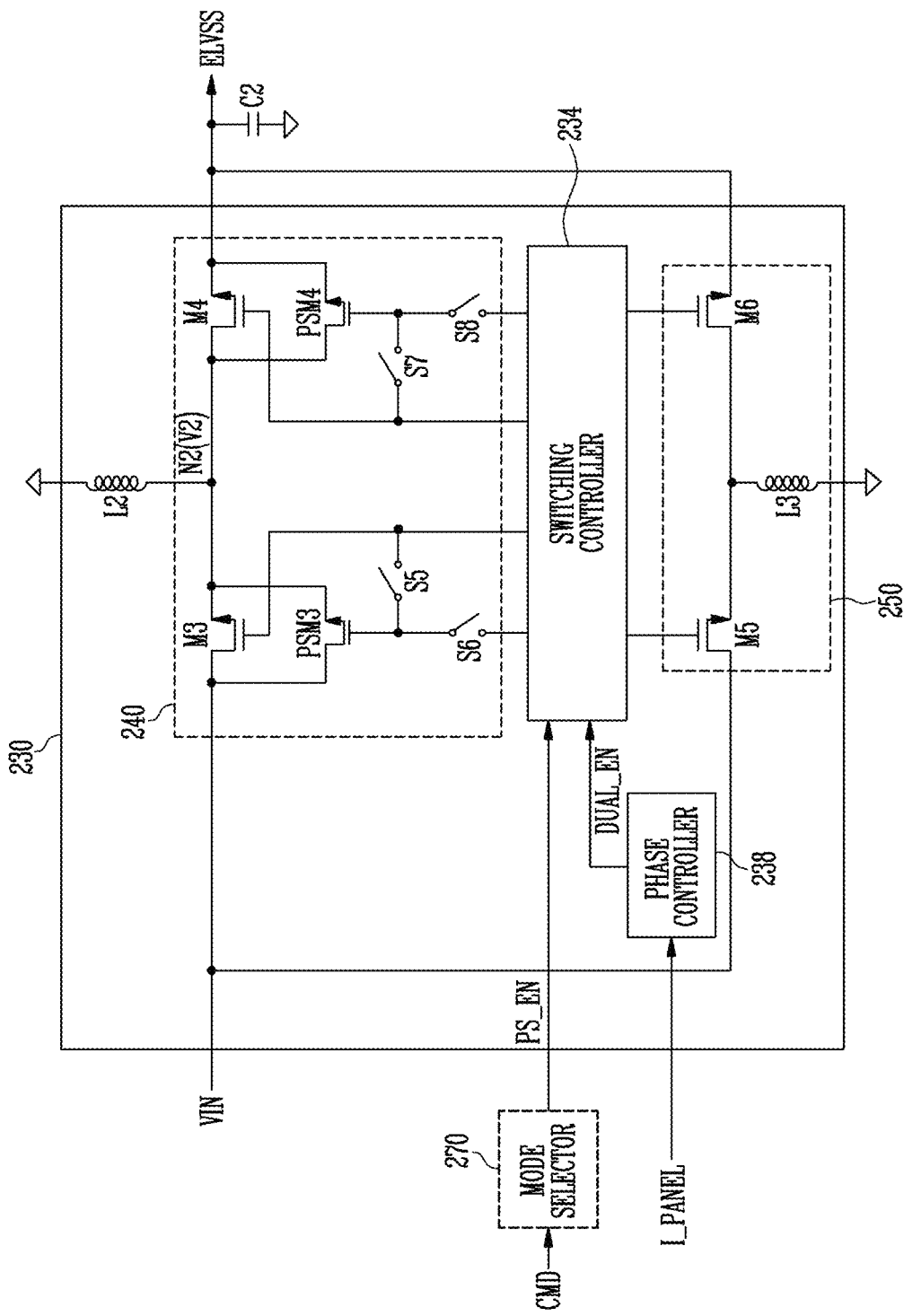
FIG. 16 is a diagram illustrating an exemplary embodiment of an inverting converter module included in the DC-DC converter of FIG. 15.

FIG. 15 is a diagram illustrating a DC-DC converter according to another alternative embodiment of the disclosure. FIG. 16 is a diagram illustrating an exemplary embodiment of an inverting converter module included in the DC-DC converter of FIG. 15.

The DC-DC converter 200 of FIGS. 15 and 16 may be substantially the same as the DC-DC converter of FIG. 2, except for an inverting converter module 230. In FIGS. 15 and 16, components identical to those described with reference to FIGS. 2 and 5 are designated by like reference numerals, and any repetitive detailed description thereof will be omitted.

Referring to FIGS. 15 and 16, an embodiment of the DC-DC converter 200 may include a boost converter 220, the inverting converter module 230, and a mode selector 270. The inverting converter module 230 may include a first inverting converter 240 and a second inverting converter 250.

The boost converter 220 may correspond to one of the embodiments of the first converter 120 and 120A described above with reference to FIGS. 2 to 12. The boost converter 220 may output the first power voltage ELVDD in the first driving manner (e.g., the CCM manner) in the normal mode, and output the first power voltage ELVDD in the second driving manner (e.g., the DCM manner) in the power saving mode.

The first inverting converter 240 may correspond to one of the embodiments of the second converter 140 and 140A described above with reference to FIGS. 2 to 12. The first inverting converter 240 may output the second power voltage ELVSS in the third driving manner in the power saving mode, and output the second power voltage ELVSS in one of the first, second and third driving manners based on the magnitude of a load of the display panel in the normal mode. In an embodiment, as shown in FIG. 16, the first inverting converter 240 may have a configuration substantially identical to that of the second converter 140A of FIG. 8.

The inverting converter module 230 may further include a phase controller for determining whether the second inverting converter 250 is to be driven, based on a load I_PANEL of the display panel, and a switching controller 234 for controlling driving of the first inverting converter 240 and the second inverting converter 250, based on an output DUAL_EN of the phase controller 238 and the mode control signal PS_EN.

In an embodiment, the second inverting converter 250 does not operate in the power saving mode. In such an embodiment, the second inverting converter 250 may output the second power voltage ELVSS in the first driving manner or the second driving manner in the normal mode only when the load I_PANEL of the display panel exceeds a preset reference load. In such an embodiment, the second inverting converter 250 along with the first inverting converter 240 may output the second power voltage ELVSS only when a high-luminance image having a preset level or higher is displayed.

Accordingly, only the first inverting converter 240 outputs the second power voltage ELVSS with respect to low luminance to middle luminance in the power saving mode, so that the power consumption of the DC-DC converter 200 may be reduced.

In embodiments of a DC-DC converter and a display device including the DC-DC converter according to the disclosure, power voltages are output using a change in driving manner in the DC-DC converter and a change in second power voltage according to driving manners, so that the power consumption caused by switching may be reduced. Thus, in such embodiments, the heat generation and power consumption of the DC-DC converter and the display device including the DC-DC converter may be reduced, and the conversion efficiency of the power voltages may be improved.

Further, in such embodiments of the DC-DC converter and the display device including the DC-DC converter according to the disclosure, the driving manner and the second power voltage between the normal mode and the power saving mode may be relatively freely controlled without any additional component. Thus, the cost to realize the power saving mode (e.g., the AOD mode) may be reduced, and the luminance in the power saving mode having a level higher than that of the existing power saving mode may be implemented under an external environment in which ambient illumination is bright. In such embodiments, the driving manner of the DC-DC converter and/or the adjustment of the magnitude of the second power voltage may be relatively easily performed. Accordingly, the maximum luminance in the power saving mode may be flexibly controlled.

The invention should not be construed as being limited to the exemplary embodiments set forth herein. Rather, these exemplary embodiments are provided so that this disclosure will be thorough and complete and will fully convey the concept of the invention to those skilled in the art. In some instances, as would be apparent to one of ordinary skill in the art as of the filing of the application, features, characteristics, and/or elements described in connection with a particular embodiment may be used singly or in combination with features, characteristics, and/or elements described in connection with other embodiments unless otherwise specifically indicated.

While the invention has been particularly shown and described with reference to exemplary embodiments thereof, it will be understood by those of ordinary skill in the art that various changes in form and details may be made therein without departing from the spirit or scope of the invention as defined by the following claims.

What is claimed is:

1. A direct current-to-direct current converter comprising:
a first converter which outputs a first power voltage in a normal mode or in a power saving mode based on a first inductor current generated by alternately turning on a plurality of transistors therein, wherein the first converter operates in a first driving manner in the normal mode, and operates in a second driving manner in the power saving mode;
a second converter which outputs a second power voltage based on a second inductor current generated by alternately turning on a plurality of transistors therein, wherein the second converter operates in a third driving manner in the power saving mode, and a magnitude of the second power voltage in the power saving mode is different from a magnitude of the second power voltage in the normal mode; and
a mode selector which supplies a mode control signal to the first and second converters, wherein the first and second converters are driven in the normal mode or the power saving mode based on the mode control signal,
wherein the first power voltage is greater than the second power voltage, and
wherein the second converter changes the magnitude of the second power voltage in a vertical blank period.

2. The direct current-to-direct current converter of claim 1, wherein the second converter changes the magnitude of the second power voltage while switching a driving manner thereof in synchronization with the mode control signal in the vertical blank period.

3. The direct current-to-direct current converter of claim 1, wherein
the second converter switches a driving manner thereof in synchronization with the mode control signal in another vertical blank period,
the magnitude of the second power voltage is changed step by step to a power saving mode target level throughout a plurality of vertical blank periods before a driving mode is switched from the normal mode to the power saving mode, and
the magnitude of the second power voltage is changed step by step to a normal mode target level throughout a plurality of vertical blank periods after the driving mode is switched from the power saving mode to the normal mode.

4. The direct current-to-direct current converter of claim 1, wherein
the mode selector allows the mode control signal to be enabled in a black image period, and
the second converter changes the magnitude of the second power voltage in the black image period and switches a driving manner thereof in synchronization with the mode control signal.

5. The direct current-to-direct current converter of claim 1, further comprising:
a protector which compares a variation in the first power voltage output from the first converter with a preset reference voltage during a black image period in which a driving mode is switched between the normal mode and the power saving mode, and shuts down the direct current-to-direct current converter if the variation in the first power voltage is greater than the reference voltage.

6. The direct current-to-direct current converter of claim 5, wherein
switching operations of the first and second converters are stopped in the black image period, and
the protector compares the variation in the first power voltage with the reference voltage in a state in which an output end of the first converter and an output end of the second converter are floated in the black image period.

7. The direct current-to-direct current converter of claim 1, further comprising:
a protector which compares the second power voltage output from the second converter with a preset reference voltage during a black image period in which a driving mode is switched between the normal mode and the power saving mode, and shuts down the direct current-to-direct current converter if the magnitude of the second power voltage is greater than the reference voltage,
wherein switching operation of the second converter is stopped during at least a portion of the black image period.

8. The direct current-to-direct current converter of claim 1, wherein the second converter operates in one of the first driving manner, the second driving manner and the third driving manner, which is determined based on a magnitude of a load of a display panel connected thereto, in the normal mode.

9. The direct current-to-direct current converter of claim 8, wherein the third driving manner is implemented as a pulse frequency modulation manner.

10. The direct current-to-direct current converter of claim 8, wherein
when the first converter operates in the first driving manner, a magnitude of the first inductor current is continuously changed, and
when the first converter operates in the second driving manner, the magnitude of the first inductor current is not changed during a predetermined period.

11. The direct current-to-direct current converter of claim 10, wherein
when the second converter operates in the second driving manner, a magnitude of the second inductor current is not changed during a first discontinuous period,
when the second converter operates in the third driving manner, the magnitude of the second inductor current is not changed during a second discontinuous period, and
the second discontinuous period is longer than the first discontinuous period.

12. The direct current-to-direct current converter of claim 11, wherein a switching frequency of the transistors in the second driving manner is decreased to a preset value as a magnitude of a load of a display panel connected thereto is decreased.

13. The direct current-to-direct current converter of claim 12, wherein a switching frequency of the transistors in the third driving manner is lower than the switching frequency of the transistors in the second driving manner.

14. The direct current-to-direct current converter of claim 1, wherein
the first inductor current generated in the first driving manner has a first peak value, and
the first inductor current generated in the second driving manner has a second peak value less than the first peak value.

15. The direct current-to-direct current converter of claim 8, further comprising:
a third converter which outputs a third power voltage based on a third inductor current generated by alternately turning on a plurality of transistors therein, wherein the third converter operates in the third driving manner in the power saving mode, and operates in one of the first driving manner, the second driving manner and the third driving manner, which is determined based on a magnitude of a load of a display panel connected thereto, in the normal mode.

16. The direct current-to-direct current converter of claim 15, wherein
the first power voltage and the second power voltage are supplied to pixels of the display panel to drive the pixels, and
the third power voltage is supplied to a data driver to drive the data driver.

* * * * *